(12) United States Patent
Eyada

(10) Patent No.: US 8,955,107 B2
(45) Date of Patent: Feb. 10, 2015

(54) HIERARCHICAL APPLICATION OF SECURITY SERVICES WITHIN A COMPUTER NETWORK

(75) Inventor: Hatem Eyada, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1257 days.

(21) Appl. No.: 12/209,695

(22) Filed: Sep. 12, 2008

(65) Prior Publication Data

US 2010/0071024 A1    Mar. 18, 2010

(51) Int. Cl.
G06F 11/00    (2006.01)
G06F 17/00    (2006.01)
H04L 29/06    (2006.01)

(52) U.S. Cl.
CPC ........... *H04L 63/0263* (2013.01); *H04L 63/105* (2013.01); *H04L 63/1458* (2013.01); *H04L 63/20* (2013.01)
USPC .............................................. 726/22; 726/1

(58) Field of Classification Search
USPC ......................................................... 726/22
See application file for complete search history.

(56) References Cited

U.S. PATENT DOCUMENTS

| | | |
|---|---|---|
| 3,962,681 A | 6/1976 | Requa et al. |
| 4,032,899 A | 6/1977 | Jenny et al. |
| 4,600,319 A | 7/1986 | Everett, Jr. |
| 5,408,539 A | 4/1995 | Finlay et al. |
| 5,426,637 A | 6/1995 | Derby et al. |
| 5,490,252 A | 2/1996 | Macera et al. |
| 5,509,123 A | 4/1996 | Dobbins et al. |
| 5,568,471 A | 10/1996 | Hershey et al. |
| 5,598,355 A | 1/1997 | Derou et al. |
| 5,598,532 A | 1/1997 | Liron |
| 6,011,795 A | 1/2000 | Varghese et al. |
| 6,018,765 A | 1/2000 | Durana et al. |
| 6,148,335 A | 11/2000 | Haggard et al. |

(Continued)

FOREIGN PATENT DOCUMENTS

| | | |
|---|---|---|
| WO | 2007070838 A2 | 6/2007 |
| WO | 2008070549 A2 | 6/2008 |

OTHER PUBLICATIONS

European Search Report for EP Application No. 09167870.6 dated Feb. 16, 2010, 7pp.

(Continued)

*Primary Examiner* — Techane Gergiso
(74) *Attorney, Agent, or Firm* — Shumaker & Sieffert, P.A.

(57) ABSTRACT

In general, techniques are described for hierarchical application of security services with a network device. In particular, the network device receives security classification information that maps a security class to one or more computing devices. The security class identifies security capabilities of the computing devices. The network device also receives network traffic associated with the computing device and applies a set of patterns defined by a policy associated with the security class to the network traffic to detect a set of network attacks. Based on the application of the set of patterns, the network device forwards the network traffic. As a result of receiving security classification information, the network device may become aware of the security capabilities of the computing device and only apply those patterns required to augment these detected security capabilities, thereby preventing application of overlapping security services through application of these services in a hierarchical manner.

41 Claims, 6 Drawing Sheets

(56) References Cited

U.S. PATENT DOCUMENTS

| | | | |
|---|---|---|---|
| 6,182,146 B1 | 1/2001 | Graham-Cumming, Jr. | |
| 6,219,706 B1 | 4/2001 | Fan et al. | |
| 6,279,035 B1 | 8/2001 | Brown et al. | |
| 6,301,244 B1 | 10/2001 | Huang et al. | |
| 6,321,338 B1 | 11/2001 | Porras et al. | |
| 6,377,551 B1 | 4/2002 | Luo et al. | |
| 6,392,996 B1 | 5/2002 | Hjalmtysson | |
| 6,473,405 B2 | 10/2002 | Ricciulli | |
| 6,499,088 B1 | 12/2002 | Wexler et al. | |
| 6,563,796 B1 | 5/2003 | Saito | |
| 6,590,898 B1 | 7/2003 | Uzun | |
| 6,594,268 B1 | 7/2003 | Aukia et al. | |
| 6,598,034 B1* | 7/2003 | Kloth | 706/47 |
| 6,633,563 B1 | 10/2003 | Lin et al. | |
| 6,735,201 B1 | 5/2004 | Mahajan et al. | |
| 6,751,663 B1 | 6/2004 | Farrell et al. | |
| 6,826,713 B1 | 11/2004 | Beesley et al. | |
| 6,870,817 B2 | 3/2005 | Dolinar et al. | |
| 6,970,943 B1 | 11/2005 | Subramanian et al. | |
| 6,975,628 B2 | 12/2005 | Johnson et al. | |
| 6,981,055 B1 | 12/2005 | Ahuja et al. | |
| 6,983,294 B2 | 1/2006 | Jones et al. | |
| 6,985,956 B2 | 1/2006 | Luke et al. | |
| 6,996,105 B1 | 2/2006 | Wilson | |
| 7,020,087 B2 | 3/2006 | Steinberg et al. | |
| 7,054,930 B1* | 5/2006 | Cheriton | 709/226 |
| 7,058,974 B1* | 6/2006 | Maher et al. | 726/13 |
| 7,099,320 B1* | 8/2006 | Salerno | 370/389 |
| 7,114,008 B2 | 9/2006 | Jungck et al. | |
| 7,120,931 B1* | 10/2006 | Cheriton | 726/13 |
| 7,162,740 B2 | 1/2007 | Eastlake, III | |
| 7,167,593 B2 | 1/2007 | Singh | |
| 7,185,368 B2 | 2/2007 | Copeland, III | |
| 7,200,117 B2 | 4/2007 | Chiu et al. | |
| 7,203,740 B1 | 4/2007 | Putzolu et al. | |
| 7,254,138 B2 | 8/2007 | Sandstrom | |
| 7,257,672 B2* | 8/2007 | Shoham et al. | 711/108 |
| 7,289,489 B1 | 10/2007 | Kung et al. | |
| 7,301,899 B2 | 11/2007 | Goldstone | |
| 7,339,897 B2 | 3/2008 | Larsson et al. | |
| 7,356,585 B1* | 4/2008 | Brook et al. | 709/224 |
| 7,362,763 B2 | 4/2008 | Wybenga et al. | |
| 7,403,487 B1 | 7/2008 | Foladare et al. | |
| 7,460,473 B1 | 12/2008 | Kodama et al. | |
| 7,478,155 B2 | 1/2009 | Couturier et al. | |
| 7,496,661 B1 | 2/2009 | Morford et al. | |
| 7,496,955 B2 | 2/2009 | Akundi et al. | |
| 7,546,635 B1 | 6/2009 | Krohn et al. | |
| 7,555,092 B2 | 6/2009 | Russell et al. | |
| 7,584,298 B2 | 9/2009 | Klinker et al. | |
| 7,596,807 B2* | 9/2009 | Ptacek et al. | 726/11 |
| 7,599,385 B1 | 10/2009 | Andrade et al. | |
| 7,643,408 B2 | 1/2010 | Atkinson et al. | |
| 7,646,771 B2* | 1/2010 | Guru et al. | 370/392 |
| 7,650,426 B2 | 1/2010 | Bamba | |
| 7,688,739 B2 | 3/2010 | Frei et al. | |
| 7,725,587 B1* | 5/2010 | Jacoby et al. | 709/229 |
| 7,725,934 B2* | 5/2010 | Kumar et al. | 726/22 |
| 7,735,116 B1* | 6/2010 | Gauvin | 726/2 |
| 7,792,991 B2 | 9/2010 | Shand | |
| 7,809,820 B2 | 10/2010 | Stepin et al. | |
| 7,810,151 B1* | 10/2010 | Guruswamy | 726/13 |
| 7,827,402 B2* | 11/2010 | Smith | 713/160 |
| 7,860,999 B1 | 12/2010 | Subramanian et al. | |
| 7,865,278 B2 | 1/2011 | Underdal et al. | |
| 7,869,355 B2 | 1/2011 | Kodama et al. | |
| 7,937,353 B2* | 5/2011 | Bernoth et al. | 706/46 |
| 7,966,659 B1* | 6/2011 | Wilkinson et al. | 726/22 |
| 7,992,208 B2* | 8/2011 | Khandani et al. | 726/25 |
| 7,996,670 B1* | 8/2011 | Krishna et al. | 713/162 |
| 8,005,966 B2* | 8/2011 | Pandya | 709/228 |
| 8,018,866 B1 | 9/2011 | Kasturi et al. | |
| 8,040,808 B1 | 10/2011 | Kasturi et al. | |
| 8,051,185 B2 | 11/2011 | Lee et al. | |
| 8,094,575 B1 | 1/2012 | Vadlakonda et al. | |
| 8,136,126 B2 | 3/2012 | McBrearty et al. | |
| 8,166,492 B2 | 4/2012 | Fathalla | |
| 8,321,437 B2 | 11/2012 | Lim | |
| 8,339,959 B1 | 12/2012 | Moisand et al. | |
| 8,706,877 B2 | 4/2014 | Sundarrajan et al. | |
| 2002/0095492 A1 | 7/2002 | Kaashoek et al. | |
| 2002/0126621 A1 | 9/2002 | Johnson et al. | |
| 2002/0141343 A1 | 10/2002 | Bays | |
| 2003/0005145 A1 | 1/2003 | Bullard | |
| 2003/0014665 A1 | 1/2003 | Anderson et al. | |
| 2003/0097557 A1 | 5/2003 | Tarquini et al. | |
| 2003/0110274 A1 | 6/2003 | Pazi et al. | |
| 2003/0120769 A1 | 6/2003 | McCollom et al. | |
| 2003/0145104 A1 | 7/2003 | Boden et al. | |
| 2003/0214913 A1 | 11/2003 | Kan et al. | |
| 2004/0001514 A1 | 1/2004 | Wookey et al. | |
| 2004/0013119 A1* | 1/2004 | MeLampy et al. | 370/395.21 |
| 2004/0015721 A1 | 1/2004 | Eastlake, III | |
| 2004/0044912 A1 | 3/2004 | Connary et al. | |
| 2004/0078485 A1 | 4/2004 | Narayanan | |
| 2004/0093513 A1* | 5/2004 | Cantrell et al. | 713/201 |
| 2004/0196843 A1 | 10/2004 | Zinin | |
| 2004/0205360 A1* | 10/2004 | Norton et al. | 713/201 |
| 2004/0255202 A1 | 12/2004 | Wong et al. | |
| 2005/0044406 A1* | 2/2005 | Stute | 713/201 |
| 2005/0066053 A1* | 3/2005 | McDysan | 709/243 |
| 2005/0102414 A1* | 5/2005 | Hares et al. | 709/232 |
| 2005/0111367 A1* | 5/2005 | Chao et al. | 370/235 |
| 2005/0114700 A1* | 5/2005 | Barrie et al. | 713/201 |
| 2005/0160289 A1 | 7/2005 | Shay | |
| 2005/0210533 A1* | 9/2005 | Copeland et al. | 726/23 |
| 2005/0220037 A1* | 10/2005 | Mann et al. | 370/252 |
| 2005/0289219 A1* | 12/2005 | Nazzal | 709/203 |
| 2006/0026669 A1* | 2/2006 | Zakas | 726/6 |
| 2006/0089994 A1 | 4/2006 | Hayes | |
| 2006/0123481 A1 | 6/2006 | Bhatnagar et al. | |
| 2006/0146816 A1* | 7/2006 | Jain | 370/389 |
| 2006/0146825 A1 | 7/2006 | Hofstaedter et al. | |
| 2006/0156403 A1 | 7/2006 | Haeffele et al. | |
| 2006/0185008 A1 | 8/2006 | Le et al. | |
| 2006/0195896 A1* | 8/2006 | Fulp et al. | 726/11 |
| 2006/0206485 A1* | 9/2006 | Rubin et al. | 707/9 |
| 2006/0259970 A1* | 11/2006 | Sheymov et al. | 726/23 |
| 2007/0027992 A1* | 2/2007 | Judge et al. | 709/227 |
| 2007/0067438 A1* | 3/2007 | Goranson et al. | 709/224 |
| 2007/0121596 A1* | 5/2007 | Kurapati et al. | 370/356 |
| 2007/0180511 A1 | 8/2007 | Eastlake, III | |
| 2007/0192863 A1* | 8/2007 | Kapoor et al. | 726/23 |
| 2007/0239987 A1* | 10/2007 | Hoole et al. | 713/169 |
| 2007/0245028 A1 | 10/2007 | Baxter et al. | |
| 2007/0294369 A1 | 12/2007 | Ginter et al. | |
| 2008/0010225 A1* | 1/2008 | Gonsalves et al. | 706/11 |
| 2008/0034425 A1* | 2/2008 | Overcash et al. | 726/22 |
| 2008/0077694 A1* | 3/2008 | Nordmark et al. | 709/227 |
| 2008/0077705 A1* | 3/2008 | Li et al. | 709/236 |
| 2008/0091812 A1 | 4/2008 | Lev-Ran et al. | |
| 2008/0112325 A1 | 5/2008 | Sivakumar et al. | |
| 2008/0123533 A1 | 5/2008 | Vasseur et al. | |
| 2008/0127338 A1* | 5/2008 | Cho et al. | 726/22 |
| 2008/0165784 A1 | 7/2008 | Ko et al. | |
| 2008/0168135 A1* | 7/2008 | Redlich et al. | 709/204 |
| 2008/0201311 A1 | 8/2008 | Ertugrul et al. | |
| 2008/0222283 A1 | 9/2008 | Ertugrul et al. | |
| 2008/0225710 A1 | 9/2008 | Raja et al. | |
| 2008/0240128 A1* | 10/2008 | Elrod | 370/401 |
| 2008/0298392 A1* | 12/2008 | Sanchez et al. | 370/469 |
| 2008/0320151 A1 | 12/2008 | McCanne et al. | |
| 2009/0003349 A1 | 1/2009 | Havemann et al. | |
| 2009/0019538 A1* | 1/2009 | Pandya | 726/13 |
| 2009/0034417 A1 | 2/2009 | Kondamuru et al. | |
| 2009/0067440 A1 | 3/2009 | Chadda et al. | |
| 2009/0073884 A1 | 3/2009 | Kodama et al. | |
| 2009/0092137 A1 | 4/2009 | Haigh et al. | |
| 2009/0126003 A1* | 5/2009 | Touboul | 726/13 |
| 2009/0232150 A1 | 9/2009 | Mistry | |
| 2009/0287968 A1 | 11/2009 | Lee et al. | |
| 2009/0288157 A1* | 11/2009 | Pacella et al. | 726/12 |
| 2010/0085892 A1 | 4/2010 | Kouhi | |
| 2011/0197278 A1* | 8/2011 | Chow et al. | 726/24 |

(56) References Cited

U.S. PATENT DOCUMENTS

OTHER PUBLICATIONS

Weaver, A.C. et al., "A Real-Time Monitor for Token Ring Networks," Military Communications Conference, 1989. MILCOM '89, Oct. 1989, vol. 3, pp. 794-798.

Dini, P. et al., "Performance Evaluation for Distributed System Components," Proceedings of IEEE Second International Workshop on Systems Management, Jun. 1996, pp. 20-29.

Integrated Services Adapter, 2000, Cisco Systems, Data Sheet, pp. 1-6, http://www.cisco.com/warp/public/cc/pd/ifaa/svaa/iasvaa/prodlit/ism2_ds.pdf.

"Application Flow Acceleration for Web (HTTP) Traffic," Juniper Networks, Inc., 2005, 8 pgs.

U.S. Appl. No. 12/182,619, filed Jul. 30, 2008, entitled "Streamlined Packet Forwarding Using Dynamic Filters for Routing and Security in a Shared Forwarding Plane."

U.S. Appl. No. 12/254,034, filed Oct. 20, 2008, entitled "Service Aware Path Selection With a Network Acceleration Device."

Translation and Original Notification of Third Office Action mailed Sep. 17, 2013 in corresponding CN Application No. 200910173743.8, 9 pgs.

Notification of the Second Office Action mailed Dec. 31, 2012 from the State Intellectual Property Office of P.R.C. In corresponding CN Application Serial No. 200910173743.8, 19 pgs.

Fourth Office Action from corresponding Chinese Application No. 200910173743.8, mailed Apr. 3, 2014, 7 pp.

"About Endace," www.endace.com, 2002, 1 pp.

"Cisco IOS NetFlow," Cisco Systems, (Cysco copyright 1992-2002), 1 pp.

Egan, "Sample TCP/IP Packet," Version 0.0.0, www.passwall.com, Aug. 7, 2000, 8 pp.

"TCP Packet Field Descriptions," Analyser Sales Ltd., www.ipanalyser.co.uk, Jul. 8, 2003, 2 pp.

"The CAIDA Web Site," UC Regents, www.caida.org, 2002, 1 pp.

"Well-Known TCP Port Number," Jupitermedia Corporation, www.webopedia.com, 2004, 3 pp.

Bernstein, "SYN Cookies," http://cr.yp.to/syncookies.html, Oct. 9, 2003, 3 pp.

Lemon, "Resisting SYN Flood DoS Attacks with a SYN Cache," USENIX Association, Proceedings of the BSDCon 2002 Conference, retrieved from http://people.freebsd.org/-18 jlemon/papers/syncache.pdf, Feb. 11-14, 2002, 10 pp.

"Combating Bots and Mitigating DDos Attacks," Juniper Networks, Inc., Apr. 2006, 8 pp.

Berger et al., "The OSPF Opaque LSA Option," Network Working Group, RFC 5250, The IETF Trust, Jul. 2008, 16 pp.

Gibbs, "A Guide to Original SYN," Network World, www.nwfusion.com, Nov. 13, 2000, 2 pp.

Egan, "Decomposition of a TCP Packet," www.passwall.com, Aug. 7, 2000, 4 pp.

Staniford et al., "Practical Automated Detection of Stealthy Portscans," Journal of Computer Security, IOS Press, 2002, 16 pp.

U.S. Appl. No. 13/275,182, by Rohini Kasturi, filed Oct. 17, 2011.

Final Office Action from U.S. Appl. No. 13/275,182, dated Jun. 10, 2014, 8 pp.

Amendment filed Sep. 3, 2014 to the Final Office Action dated Jun. 10, 2014 in U.S. Appl. No. 13/275,182, 16 pgs.

Office Action including translation dated Apr. 16, 2012 received in corresponding CN Application Serial No. 200910173743.8, 17 pgs.

\* cited by examiner

HIERARCHICAL APPLICATION OF SECURITY SERVICES WITHIN A COMPUTER NETWORK

TECHNICAL FIELD

The invention relates to computer networks and, more particularly, to application of security services within computer networks.

BACKGROUND

A computer network typically includes a collection of interconnected computing devices that exchange data and share resources. The devices may include, for example, web servers, database servers, file servers, routers, printers, end-user computers and other devices. The variety of devices may execute a number of different services, operating systems (or operating system versions) and communication protocols. Each of the different services, operating systems and communication protocols may expose the network to different security vulnerabilities. A malicious user or "hacker" may exploit these security vulnerabilities to gain unauthorized access to, disrupt or generally attack the network.

Typically, techniques for detecting these network attacks use pattern matching. In particular, an Intrusion Detection and Prevention ("IDP") device may reside at an edge of a network and be statically configured or provisioned to apply regular expressions or sub-string matches to detect defined attack patterns within data streams entering the network. Some networks may feature more or less security vulnerabilities that require the IDP device to be statically provisioned to identify and/or prevent more or less attacks.

When a conventional IDP device is deployed to protect a plurality of networks or sub-networks, often the IDP device is statically provisioned to apply a set of security services in order to identify and/or prevent all of the known network attacks capable of exploiting any of the security vulnerabilities of the least secure one of the plurality of networks. In this respect, the IDP device apply services so as to identify and/or prevent attacks that attempt to exploit security vulnerabilities not present in the other more secure networks of the plurality of networks. In this way the network featuring the most security vulnerabilities may therefore directly influence the number of different security services the IDP device is statically configured to apply in an attempt to identify and/or prevent all of the different types of network attacks within all data streams processed by the IDP device regardless of whether each particular stream is directed to the most vulnerable network or not.

Because the IDP device may be statically configured to apply network security services that attempt to identify attacks in data streams that are destined for networks that are invulnerable to such attacks, the IDP device may introduce certain network inefficiencies. That is, IDP device resources may be unnecessarily wasted to identify and/or prevent these attacks even though the attacks may ultimately be unsuccessful due to the nature of the secure network to which the packets are destined. These network inefficiencies may become particularly noticeable during times of high network congestion, when for example, the IDP device may not be able to process the high-levels of network traffic. Under such circumstances, the network inefficiencies may introduce delay or prevent the delivery of the packets. Thus, by being statically provisioning the IDP device to identify and/or prevent attacks for the lowest common denominator of networks or network devices, e.g., the least secure or most vulnerable network, the IDP device may, during times of high network congestion, compromise network connectivity.

SUMMARY

In general, techniques are described for hierarchical application of security services offered by one or more network devices, such as a router that incorporates an intrusion detection/prevention (IDP) module. The hierarchical application may be achieved by dynamically collecting security information for devices within the various networks or sub-networks and classifying each the networks or sub-networks within one of the security classes based on the collected security information for the those devices within the network or sub-network. Each security class may identify a different level of security capabilities (e.g., operating system version and installed patches, installed virus software or other security application, status of virus definitions and the like) to which the devices within a network or sub-network must conform for that network or sub-network to be classified in the particular security class. The IDP device may then determine based on the security class to which the network or sub-network is mapped whether to apply a comprehensive or full set of attack patterns or a limited or subset of the full set of attack patterns to network traffic destined for or originating from the associated network. In other words, the IDP device may dynamically tailor application of attack patterns to certain packet flows based on a determined level of security capabilities of each network or sub-network associated with the packet flows, thereby becoming more "aware" of the network as a whole and potentially reducing network inefficiencies while improving network connectivity. Moreover, the IDP device may further dynamically tailor the attack patterns applied to the packet flows for the different security classes based on current network loading conditions or other factors.

In operation, network access tier devices (such as layer two (L2) switches) collect security information about each connected end-user device serviced by the access device. The L2 switches may collect this information at the time the end-user is authenticated, such as by using an end-user software access client or a 802.1x port-based network access control protocol modified to request such security information. In any case, the L2 network access tier devices may determine a security class for groups of the individual end-user devices (e.g., networks or sub-networks of the end-user devices) based on the collected information. In case there are different security classes among end-user devices of the same group, the L2 network access tier devices may sub-divide the group or more assign the lowest security class to the group to which the most vulnerable end-user device conforms. The L2 network access tier devices forward the security class information for the different networks or sub-networks to the network layer IDP devices, such as layer three (L3) routers that incorporate security services. Each IDP device receives the security classification information that identifies a mapping for a group of at least one computing or end-user device and a security class. The IDP device may select a policy associated with the security class identified by the mapping. In some instances, the IPD device may store a plurality of policies, where each of the plurality of policies is associated with a different one of the security classes. The IDP device may select the policy corresponding to the security class identified by the mapping and apply this policy to network traffic associated with the group of end-user devices.

In some cases the L2 network access tier switches may assign separate Virtual Local Area Networks (VLANs) to the different groups of end-user computing devices. The received security classification information may, in this instance, select and map an aggregate security class to the first VLAN based on the security information collected for those end-user computing devices assigned to the first VLAN, and another aggregate security class to a second VLAN based on the security information collected for those end-user computing devices assigned to the second VLAN. The IDP device may then apply a first set of security services (e.g., attack detection patterns or virus definitions) defined by a first policy associated with the first aggregate security class to traffic associated with the first VLAN, while applying a second set of security services (e.g., attack detection patterns or virus definitions) defined by a second policy associated with the second aggregate security class to traffic associated with the second VLAN.

In this manner, the IDP device may apply different sets of attack detection patterns to address different security capabilities of each VLAN. Particularly, the IDP module may apply these different sets of attack detection patterns to reduce, if not prevent, redundant application of attack detection patterns by both the IDP device and the end-user devices of the respective VLANs, as the end-user device may themselves provide varying security capabilities, e.g., execute security software and/or hardware to prevent network attacks. Moreover, by becoming aware of these security capabilities, IDP device may enable hierarchical application of the patterns or security services, as the IDP device may apply a further level of attack detection patterns or other security services not applied by the end-user devices. Further, in some cases the IDP device may avoid application of security services designed to detect certain network attacks or malicious software to which the group of end-user devices is not susceptible.

In one embodiment, a method comprises receiving, with the network device, security classification information that identifies at least one mapping between a security class and at least one computing device, wherein the security class identifies security capabilities of the at least one computing device, and receiving, with the network device, network traffic associated with the at least one computing device. The method further comprises applying, with the network device, a set of patterns defined by a policy associated with the security class to the network traffic to detect a corresponding set of network attacks, and forwarding, with the network device, the network traffic based on the application of the set of patterns.

In another embodiment, a network device comprises a control unit that receives security classification information identifying at least one mapping between a security class and at least one computing device, wherein the security class identifies security capabilities of the computing device, receives network traffic associated with the at least one computing device, applies a set of patterns defined by a policy associated with the security class to the network traffic to detect a set of network attacks and forwards the network traffic based on the application of the set of patterns.

In another embodiment, a network system comprises a set of computing devices, an access device that couples to the set of computing devices, and a network device that couples to the access device. The network device includes a control unit that receives security classification information from the access device identifying at least one mapping between a security class and the set of computing devices, wherein the security class identifies security capabilities of the set of computing devices, receives network traffic associated with the set of computing devices, applies a set of patterns defined by a policy associated with the security class to the network traffic to detect a set of network attacks and forwards the network traffic based on the application of the set of patterns.

In another embodiment, a computer-readable storage medium comprising instructions for causing a programmable processor to receive, with the network device, security classification information that identifies at least one mapping between a security class and at least one computing device, wherein the security class identifies security capabilities of the at least one computing device, and receive, with the network device, network traffic associated with the at least one computing device. The instructions further cause the processor to apply, with the network device, a set of patterns defined by a policy associated with the security class to the network traffic to detect a corresponding set of network attacks, and forward, with the network device, the network traffic based on the application of the set of patterns.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
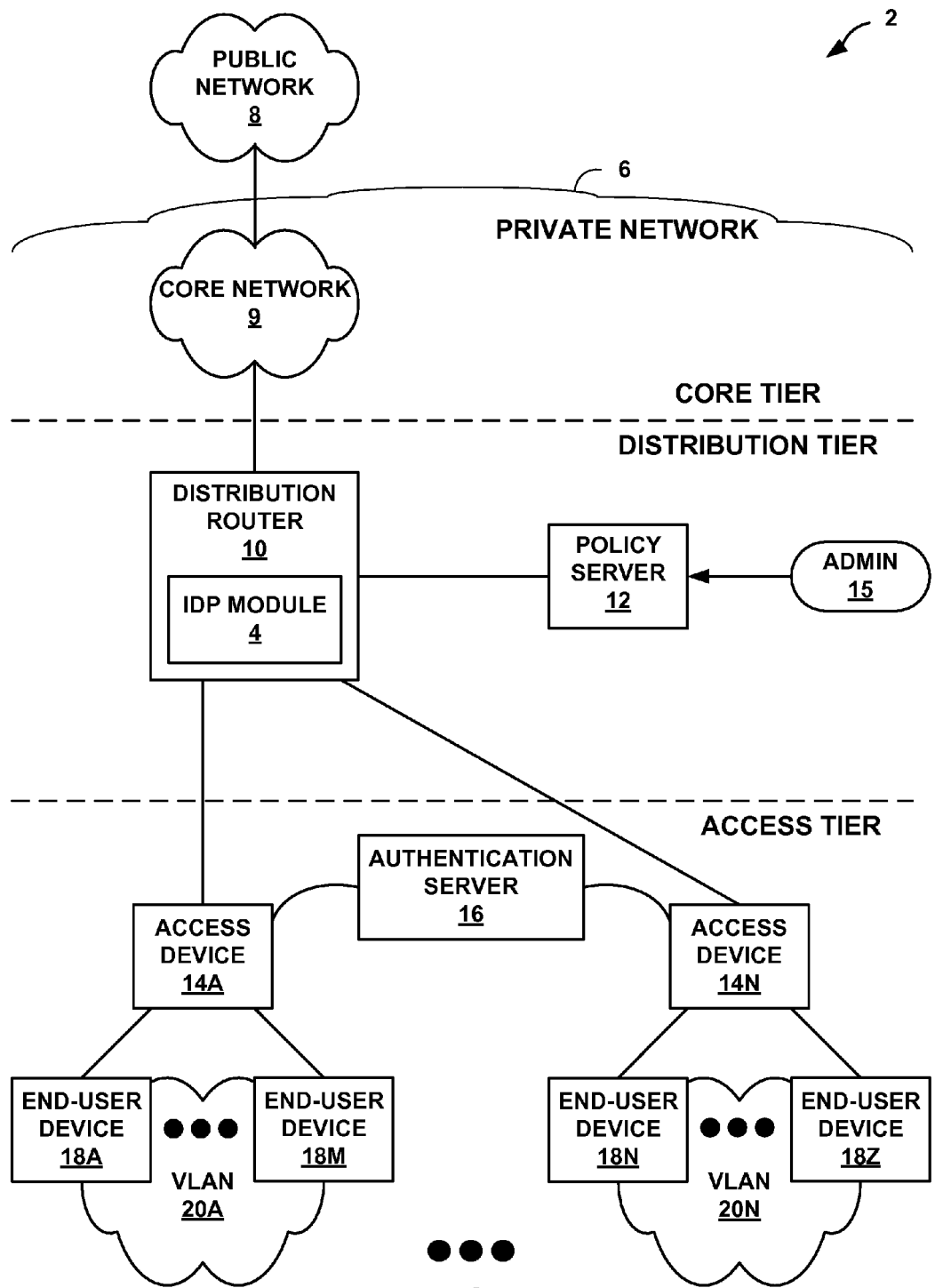
FIG. 1 is a block diagram illustrating an exemplary network system in which an intrusion detection/prevention module of a router performs hierarchical security techniques for different groups of end-user devices in accordance with the principles of the invention.

FIG. 1 is a block diagram illustrating an exemplary network system 2 in which an intrusion detection/prevention module 4 of a distribution router 10 performs hierarchical security techniques in accordance with the principles of the invention. While shown as a module integrated within distribution router 10, intrusion detection/prevention module 4 ("IDP module 4") may be implemented within a stand-alone device, such as an IDP device, firewall or any other type of network security device separate from distribution router 10. Thus, although described below in reference to router 10, the hierarchical security techniques may be implemented by any network device or network security device to dynamically reduce overlapping application of security services in response to monitored security capabilities within a network, such as a private network 6.

As shown in FIG. 1, network system 2 includes private network 6 coupled to a public network 8. Public network 8 may comprise any publically accessible computer network, such as the Internet. Public network 8 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. Typically, these devices communicate with one another via a packet-based protocol, such as an Internet Protocol (IP)/Transmission Control Protocol (TCP). As a result, public network 8 may represent or be referred to as a "packet-based" computer network.

Private network 6 may represent a network that is owned, operated and maintained typically by a private entity, such as an enterprise or business, and which is not generally accessible by the public. Private network 6 may reflect a topology referred to as a "three-tiered hierarchical model." The three-tiered hierarchical model may enable scalability among dispersed interconnected private networks, such as private network 6. The three tiers may include a first core tier, a second distribution tier and a third access tier. The core tier may include physical interconnects, gateways, and other components to provide optimal transport between sites or distribution tier devices. The distribution tier may include routers and other devices that implement policies regarding security, traffic loading and routing. These devices typically conform to layer three (L3 or network layer) of the OSI networking model The access tier of the three-tier hierarchical model shown in FIG. 1 may provide network access hubs or switches that conform to layer two (L2 or data link layer) of the OSI networking model to provide end-user access. While described relative to this three-tiered model, the dynamic provisioning techniques for security services may be implemented within any type of network that employs any type of network topology.

The core tier may make use of the public network 8 as a transport backbone or core network. In this instance, public network 8 may function as a core network to interconnect various distribution routers, similar to distribution router 10 of private network 6. Typically, a service provider that provides access to public network 8 also offers other services, such as Virtual Private Local Area Network (LAN) Service (VPLS), to interconnect remote or geographically separate sites of private network 6 securely over public network 8. Alternatively, private network 6 may include its own core network that interconnects the distribution routers 10 and provides access to public network 8, such as a core network 9. Core network 9, although not shown in FIG. 1, may include network devices that enable high-speed transport between various distribution tier devices, such as distribution device 10, of disparate network sites of private network 6.

The distribution tier may include a distribution router 10 and a policy server 12. Distribution router 10 may comprise a distribution tier device that aggregates traffic from various access tier devices, such as access devices 14A-14N ("access devices 14"). Distribution router 10 may therefore represent any type of network device capable of aggregating and distributing traffic among various other network devices. Distribution router 10 includes an IDP module 4 that applies security services to detect and/or prevent network attacks. In other words, IDP module 4 may intercept and process traffic prior to distribution router 10 forwarding the traffic to public network 8, core network 9 or one or more of access devices 14. IDP module 4 may, upon intercepting the network traffic, apply one or more security services to the network traffic in order to detect and/or prevent these network attacks. In this respect, IDP module 4 may represent any type of network security module capable of applying network security services to network traffic. One example of a high-speed router that incorporates a service plane for application of network security services to network traffic is described in U.S. patent application Ser. No. 12/182,619, entitled "STREAMLINED PACKET FORWARDING USING DYNAMIC FILTERS FOR ROUTING AND SECURITY IN A SHARED FORWARDING PLANE," filed Jul. 30, 2008, the entire contents of which are incorporated herein by reference.

IDP module 4 applies these network security services in accordance with security policies (which may be referred to as "policies" in this disclosure). IDP module 4 may couple to a policy server 12 and receive these policies from policy server 12. Policy server 12 may maintain these policies in a policy database or any other type of data structure of a storage medium (e.g., a hard drive, optical drive, disk drive, random access memory (RAM), etc.). Policy server 12 may interact with an administrator, such as administrator 15 ("admin 15"), in order to define the policies. Policy server 12 presents a user interface with which admin 15 interacts to define, specify, alter, revise, delete or otherwise edit the policies. Admin 15 may further interact with this or another user interface so as to enable policy server 12 to install or upload the policies to IDP module 4.

Although not shown in FIG. 1, policy server 12 may couple to a plurality of IDP devices/modules similar to that of IDP module 4 and install or upload these same policies to each of the plurality of IDP devices/modules. Furthermore, admin 15 may, instead of interfacing with policy server 12, define, specify, alter, revise, delete or otherwise edit policies through direct interaction with either or both of IDP module 4. Commonly, this direct interaction occurs in smaller networks that comprise a single or only a few IDP devices/modules.

The access or third tier of private network 6 may comprise access devices 14, authentication server 16 and end-user device 18A-18Z ("end-user device 18"). Access devices 14 may each represent a switch, a hub, and/or any other type of device capable of providing end-user devices 18 access to public network 6. Typically, access devices 14 each include a layer-2 (L2) device, but may, in some instances, include a layer-3 (L3) or even a multilayer device, e.g., both a layer-2 and layer-3 device. "Layers" as used in this disclosure may refer to layers of the Open Systems Interconnect (OSI) model. Layer-2 in the OSI model may be referred to as the "data link layer," while layer-3 refers to the "network layer."

Authentication server 16 may represent a device that maintains end-user authentication information, such as a Remote Authentication Dial-In User Service (RADIUS) server. Authentication server 16 may receive authentication requests from access devices 14 and authenticate those requests by comparing end-user information sent via the authentication request with the authentication information maintained by authentication server 16. Based on the comparison, authentication server 16 may indicate to access devices 14 whether to permit or deny entry to public network 6 to the one of end-user devices 18 that provided the end-user information.

As shown in the example of FIG. 1, end-user devices 18 may be grouped into logical networks or sub-networks, such as Virtual Local Area Networks (VLANs) 20A-20N ("VLANs 20"). To illustrate, VLAN 20A represents a logical grouping of a first set of end-user devices 18A-18M, while VLAN 20N represents a logical grouping of a second set of end-user devices 18N-18Z. One or more of VLANs 20 may represent a network logically separate from one another but that may execute on the same underlying physical network infrastructure. That is, end-user devices 18A-18M of VLAN 20A may, for example, utilize the same network infrastructure, e.g., links, switches, hubs, etc., as that of end-user devices 18N-18Z of VLAN 20N. In addition, one or more of VLANs 20 may represent a logical network that does not share the same underlying network infrastructure but instead maintains both a separate physical underlying infrastructure as well as a separate logical infrastructure. That is, end-user devices 18A-18M of VLAN 20A may, for example, utilize separate network infrastructure from that utilized by end-user devices 18N-18Z of VLAN 20N.

In some implementations, each of VLANs 20 may be associated with a separate Internet Protocol (IP) sub-network or "subnet" for short, which may be expressed as an IP address, such as 192.168.5.10, and a subnet mask, such as 255.255.255.0. The subnet mask may define the number of relevant bits of the IP address. The above subnet mask suggests that the first 24 bits, e.g., 192.168.5, of the IP address is to be considered as the subnet address. An IP subnet may also be expressing as an IP address followed by a dash and a number of relevant subnet bits, such as 192.168.5.10/24, or as an variable IP address, e.g., 192.168.5.X, where X is the variable. An IP subnet may define a range of IP addresses that falls within the identified sub-network. Given the above IP subnet address of 192.168.5.X, the IP subnet includes all IP addresses falling within the inclusive range of 192.168.5.0 through 192.168.5.255. While a typical VLAN generally includes a single IP subnet, in some instances, a single one of VLANs 20 may include multiple IP subnets. In addition, a single IP subnet may comprise multiple ones of VLANs 20. Thus, while described as a one-to-one mapping between IP subnets and VLANs 20 below, the techniques may apply to one-to-many and many-to-one mappings between IP subnets and VLANs 20.

Each of VLANs 20 may be distinguished from each other in private network 6 by a VLAN identifier or tag. Access switches 14 may be configured to append a unique (at least within public network 6) VLAN tag to each packet or other distinct data unit received from end-user devices 18 that identifies the respective one of VLANs 20 in which the respective end-user devices 18 reside. Access devices 14 may maintain a table or other suitable data structure that associates the VLAN tag with an IP address or other unique identifier identifying each of end-user devices 18, e.g., a Media Access Control (MAC) address. Access devices 14 may each maintain this table by requiring respective end-user devices 18 to register with access devices 14.

End-user devices 18 may each represent a computing device capable of interfaces with respective access devices 14 to access private network 6. End-user devices 18 may comprise one or more of a cellular phone, a personal digital assistant (PDA), a laptop computer, a desktop computer, a workstation, a printer, a server (e.g., a print server, a data server, a web server, and an application server), a database, etc. End-user device 18 may each provide a distinct set of security capabilities and/or vulnerabilities. That is, end-user device 18A may execute anti-virus software with current virus definitions, a firewall, but an out-dated or unsecure operating system (e.g., the operating system has not been patched to address most recent security concerns), End-user device 18B may execute up-to-date operating system but out-of-date anti-virus software (e.g., the software pattern database has not been updated to reflect recent network attacks). As a result, end-user devices 18 may provide some security services, e.g., anti-virus software, firewall, etc., that apply patterns similar to those applied by IDP module 4, which may result in overlapping application of security services as a result of each module 4 and devices 18 being able to apply, to some extent, the same patterns.

In accordance with the principles of the invention, IDP module 4 may dynamically select and apply security services to network traffic received from end-user devices 18 based on the security capabilities of each of the end-user devices. IDP module 4 may select and apply the security services based on the security services of individual end-user devices, or may select and apply security services based on grouping of end-user devices 18, such as VLANs 20. In other words, IDP module 4 may learn of general security capabilities of at least VLANs 20, if not, in some instances, each of the individual end-user devices 18. As a result, IDP module 4 may more effectively apply security services to network traffic based on the determined security capabilities of the end-user devices within VLANs 20 so as to reduce if not eliminate redundant or overlapping application of security services. In this respect, IDP module 4 may better utilize its computing resources to apply a "higher" level of security services that augments those "lower" level security services applied by end-user devices 18 without redundantly applying those same lower-level services, resulting in a hierarchical application of security services. The "higher" level of security services may, for example, be select security services that are more strict and more computationally intensive than those "lower" level security services applied by end-user devices 18.

To determine these security capabilities, IDP module 4 may collect information concerning the security capabilities of end-user devices 18. The collection of this information may occur hierarchically or according to the three-tiered model illustrated in FIG. 1. For example, initially, each of end-user devices 18 may request or attempt to access private network 6, whereupon respective access devices 14 may receive the requests and, in some instances, verify whether each of end-user devices 18 have been previously authenticated. Access devices 14 may verify the authentication of end-user devices 18 by maintaining an authentication table or other data structure that identifies authenticated end-user devices 18 by Internet Protocol (IP) addresses. The authentication table may also indicate a time at which the authentication expires, as well as, other information pertinent to maintaining authentication records for end-user devices 18. If the IP address of the requesting one of end-user devices 18 is included in the table, the associated one of access devices 14 may verify whether the authentication has timed-out. If not timed-out, the associated one of access devices 14 may permit the requesting one of end-user devices 18 to access private network 6.

Alternatively, authentication server 16 may maintain the authentication table. In these instances, access device 14 may, in response to receiving a request from one of end-user devices 18, access authentication server 16 to verify whether the requesting one of end-user devices 18 has been previously authenticated. If so, authentication server 16 may inform the respective one of access devices 14 that the requesting one of end-user devices 18 has been previously authenticated and the authentication is still valid, where the associated one of access devices 14 may permit the requesting one of end-user devices 18 to access private network 6.

However, assuming for purposes of illustration that the requesting one of end-user devices 18 has not been previously authenticated or that access devices 14, as a matter of policy, require re-authentication of each end-user device 18 requesting access to public network 6, access device 14 may request authenticating information from end-user devices 18. Authenticating information may comprise a signed certificate, a username and password combination, a secure key, or any other information commonly employed by an authenticating mechanism. Those of end-user devices 18 requesting access may respond to this request by providing the authentication information to the respective one of access devices 14.

Access devices 14 may then forward this information to authentication server 16, which authenticates each requesting end-user device 18 by comparing, as described above, the authenticating information received from those end-user devices 18 requesting access to authentication information maintained internally by authentication server 16. If authenticated successfully, authentication server 16 may identify successful authentication to the respective one of access devices 14, which permits the requesting one of end-user devices 18 to access private network 6. Otherwise, access devices 14 may deny access to those of end-user devices 18 requesting accesses but not properly authenticated. In those instances involving the authentication table, the device responsible for maintain this table, e.g., access devices 14 and/or authentication server 16, may update the table to reflect successful authentication.

Access devices 14 may, as a part of this authentication process, also request information regarding the security capabilities of each of end-user devices 18 requesting access to private network 6. This information concerning the security capabilities may be referred to herein as "security information." Security information may comprise information concerning an operating system currently executed by the requesting one of the end-user devices 18 (e.g., a name, type and version number of the operating system as well as all installed patches) and information concerning security software (e.g., firewall software, anti-virus software, anti-spam software and anti-malware software) installed and currently executing within the requesting one of the end-user devices 18 (e.g., a name, type and version of each security software application and any corresponding security databases). Security information may also comprise information concerning any security hardware, such as tokens or other hardware based security measures. Security information may further comprise information concerning encryption and decryption measures and information concerning any patches both to the operating system and security software as well as other software and/or hardware installed within the requesting one of end-user devices 18. Security information may therefore be used in this disclosure to refer to any information pertinent to determining security capabilities or, in other words, a level of security for a particular one of end-user devices 18.

Each of end-user devices 18 may transmit this security information during authentication in response to a security capability request issued by a respective one of access devices 14, as described above. In one embodiment, each of end-user devices 18 includes a hardware and/or software module that, independent from the authentication process, uploads this security information to a respective one of access devices 14 according to a schedule or in response to a request by a respective one of access devices 14. The hardware and/or software module may comprise one of "User Access Client" (UAC) executing on the end-user device or an enhanced "Trusted Platform Module" (TPM). The UAC may comprise a client software module installed on the end-user device for monitoring and/or configuring the end-user device. The TPM may be a hardware unit that verifies the integrity of boot components of the endpoint device, and provides a secure storage for the security information so as to prevent tampering with this security information in the event the end-user device is compromised. Security information may, in instances where end-user devices 18 include a TPM, include information concerning the presence of the TPM, as this module may be indicative of a very secure device, as well as information detailing the TPM's verification of the boot code of the end-point device.

Regardless of the manner in which access devices 14 collect the security information for each of end-point devices 18, access devices 14 may dynamically map the security information associated with each of end-point devices 18 to a security class. For example, access devices 14 may maintain a table or other mapping (or classification) mechanism, algorithm, data structure or element that takes as input the security information for one or more end-point devices and outputs a security class. The security class may identify a level of the security capabilities provided by each of end-user devices 18 as a value (which may be referred to as a "security class value") or may output a single security class value for a group of end-user devices. The mapping table may include a plurality of defined security classes, each of which identifies a normalized level of security capabilities (or security vulnerabilities) to which a device or group of devices must at least meet or exceed in order to be assigned to the class. A high security class value may indicate, for example, an end-point device or group of endpoint devices having a high level of security (or one that has few security vulnerabilities), while a low security class value may indicate an end-point device or group of endpoint devices having a low level of security (or one that has many security vulnerabilities).

The security class value may also take into account the severity of vulnerabilities. For example, the security class value may comprise a weighted average of security vulnerabilities. Each one of access devices 14 may determine the security vulnerabilities based on the security information and assign a weight to each of the security vulnerabilities and a value reflecting an importance of each of the security vulnerabilities. Each of the access devices 14 may then determine a security class based on the average of the weights multiplied by the importance value. Alternatively, the mapping or classification module of each of access devices 14 may compute a metric opposite to that based on the weighted average of the security vulnerabilities. Instead, the classification module may compute a metric measuring the effectiveness of each security capability. Again, the classification module may compute a weighted average of the security capabilities identified by the security information. The classification module may also employ some combination of the above two metrics in order to dynamically determine a security class for each end-user device 18.

The determination of the security class may be dynamic in that it occurs without administrator or other user input but occurs automatically or directly in response to receiving the security information. As the security capabilities of each of end-user devices 18 may change over time (e.g., installations of or upgrades to security software, security patches, etc.), the security information transmitted by and received from end-user devices 18 may also change over time. Thus, access device 14 may continually receive varying security information from the same one of end-user device 18 and dynamically determine a new security class for the same one of end-user device 18 possibly different from an old security class determined for that same end-user device 18. In this respect, dynamic determination of security classes may enable IDP module 4 to automatically and dynamically adapt to changing security capabilities within private network 6.

Regardless of the manner in which access device 14 dynamically determines the security class, access devices 14 may also aggregate the mappings corresponding to each of end-user devices 18. In some instances, each of access devices 14 may maintain a single repository of information, such as a table, identifying the associations or mappings for the respective ones of end-user devices 18 either that are currently accessing private network 6 and/or previously access and for which authentication has not expired. This repository may be referred to as "device security classification information." Access devices 14 may, in these instances, each maintain device security classification information for respective end-user devices 18.

Each of access devices 14 may aggregate the device security classification information, much as each of access devices 14 may aggregate network traffic from respective end-user devices 18. Each of access devices 14 may aggregate the device security classification information by any pertinent aggregation metric. Typically, each of access devices 14 aggregates the device security classification information by network, IP subnet, or VLAN to determine an aggregate security class on a per network, subnet, or VLAN basis. As each of a network, a sub-network and a VLAN may be considered a grouping or set of computing devices, the mapping may generally map an aggregate security class and any grouping, set, or aggregation of computing devices. This mapping between the aggregate security class and the set of computing devices may be referred to as "aggregate security classification information." Typically, aggregate security classification information comprises a single mapping, however aggregate security classification information may comprise multiple mappings, where, for example, each mapping defines a separate association between an aggregate security class and a different set of computing devices. Each of access devices 14 may then forward this aggregate security classification information that identifies, for example, an IP subnet address or range of IP addresses and an associated security class to IDP module 4 of distribution router 10.

IDP module 4 may, in this manner, receive and maintain this security classification information that identifies at least one mapping between a security class and at least one computing device, such as end-user device 18A. IDP module 4 may, for example, maintain the aggregate security classification information in a table or other data structure and organize the table by IP address or IP address range or prefix. For example, IDP module 4 may update a flow table to reflect the aggregate security classification information. To update the flow table, IDP module 4 may determine a policy associated with the security class and update any flow entries of the flow table associated with the at least one computing device identified by the mapping with the determined policy. IDP module 4, as described above, may, for example, receive and load policies from policy server 12 that are each associated with a different of the plurality of security classes. IDP module 4 may therefore analyze each of the policies and select the policy associated with the security class identified by the mapping and update the flow entries with this policy.

Upon intercepting or receiving network traffic associated with the at least one computing device, e.g., end-user device 18A, IDP module 4 may apply the policy associated with the security class to the network traffic to detect a set of attack patterns defined by the policy. Typically, IDP module 4 applies one or more sets of patterns defined by corresponding one or more polices to detect one or more sets of network attacks. Each policy may define a set of attack patterns, or patterns, that correspond to the set of network attacks and which when applied to both incoming and outgoing traffic may enable IDP module 4 to detect each corresponding set of network attacks. "Incoming network traffic," as used herein, may comprise both traffic leaving and entering private network 6 and thus refers to traffic incoming with respect to IDP module 4. Likewise, "outgoing traffic" may not refer to any particular direction but merely to traffic leaving IDP module 4 from the perspective of IDP module 4. Thus, incoming and outgoing may refer to the direction of traffic from the perspective of IDP module 4 and do not denote any particular direction or flow of traffic between private and public networks 6 and 8, respectively.

IDP module 4 may apply these policies by applying the patterns identified by these policies to network traffic flowing in both directions (i.e., inbound traffic received from public network 8 or core network 9 as well as outbound traffic destined to the public network or the core network) to improve the accuracy in detecting network attacks. For example, IDP module 4 may apply these patterns to both client-to-server and server-to-client communications between public network 8 and end-user devices 14. IDP module 4 may also analyze the network traffic to correlate traffic in one direction with traffic in the opposite direction for each communication session detected within the network traffic. For each client-server communication session, IDP module 4 may identify a packet flow in one direction (e.g., a client-to-server communication flow for a particular software application on the client) and a corresponding packet flow in the opposite direction (e.g., response communications flowing from the server to the client for that same software application).

IDP module 4 may identify the packet flows in the monitored traffic, and transparently reassembles application-layer communications from the packet flows. IDP module 4 may include a set of protocol-specific decoders to analyze the application-layer communications and identify application-layer transactions. In general, a "transaction" refers to a bounded series of related application-layer communications between peer devices. For example, a single TCP connection can be used to send (receive) multiple HyperText Transfer Protocol (HTTP) requests (responses). As one example, a single web-page comprising multiple images and links to HTML pages may be fetched using a single TCP connection. An HTTP decoder may be invoked by IDP module 4 to identify each request/response within the TCP connection as a different transaction. This may be useful to prevent certain attack definitions or patterns from being applied across transaction boundaries. In one embodiment, a transaction may be identified according to source and destination IP address, protocol, and source and destination port numbers. Other embodiments may identify a transaction in other ways, for example, by using media access control ("MAC") addresses.

For each transaction, the corresponding decoder may analyze the application-layer communications and extract protocol-specific elements. As an example, for an FTP login transaction, the FTP decoder may extract data corresponding to a user name, a name for the target device, a name for the client device and other information. In addition, the decoders may analyze the application-layer communications associated with each transaction to determine whether the communications contain any protocol-specific "anomalies." In general, a protocol anomaly refers to any detected irregularity within an application-layer communication that does not comply with generally accepted rules of communication for a particular protocol. The rules may, for example, be defined by published standards as well as vendor-defined specifications. Other anomalies refer to protocol events (i.e., actions) that technically comply with protocol rules but that may warrant a heightened level of scrutiny.

One example of such a protocol event is repeated failure of a File Transfer Protocol (FTP) login request. Example anomalies for the HTTP protocol include missing HTTP version information, malformed universal resource locators ("URLs"), directory traversals, header overflow, authentication overflow and cookie overflow. Example anomalies for a Simple Mail Transfer Protocol (SMTP) include too many recipients, relay attempts, and domain names that exceed a defined length. Example anomalies for a Post Office Protocol version 3 (POP3) include user overflow and failed logins.

Additional anomalies for FTP include missing arguments, usernames or pathnames that exceed a defined length and failed logins. Other anomalies include abnormal and out-of-specification data transmissions, and commands directing devices to open network connections to devices other than the client devices issuing the commands.

IDP module 4 may apply the patterns to the extracted elements and the protocol-specific anomalies identified by the protocol decoders to detect and prevent network attacks. These patterns, when applied to incoming and outgoing traffic, may therefore identify one or more attack signatures, protocol anomalies and other malicious behavior based on application layer data and other stateful protocol information. Moreover, IDP module 4 may associate particular patterns with protocols that correspond to particular applications. For a given communication session intercepted by IDP module 4, IDP module 4 may attempt to identify the application type and underlying protocol for the packet flows of the session in order to select one or more patterns to apply to the packet flows. In the event IDP module 4 detects a network attack, IDP module 4 may take one or more programmed actions, such as automatically dropping packet flows associated with the application-layer communications within which the network attack was detected to prevent the attack, thereby preserving network security.

IDP module 4 may, to determine the policy, access the flow table that corresponds to the flow associated with the at least one end-user device 18A and apply the policy identified by the accessed flow entry. Based on the application of the at least one policy, IDP module 4 may forward the network traffic. For example, if after applying the set of patterns defined by the determined policy to the classified packet, IDP module 4 detects an attack, IDP module 4 may drop, quarantine or otherwise prevent the attack from reaching a destination, such as one of end-user devices 18 by way of an associated one of access devices 14 or core network 9. If, however, after applying the determined policy to the classified packet, IDP module 4 fails to detect any attacks, distribution router 10 may forward the packet to the destination defined by the packet.

In effect, IDP module 4 may classify individual packets to a security class and adaptively apply a set of patterns to the packets based on each classification determined for the packets. As described above, IDP module 4 may maintain classification information on a per network, sub-network, or VLAN basis and therefore may dynamically apply patterns to network traffic to adapt for varying security capabilities between networks, sub-networks or VLANs. As IDP module 4 may automatically and dynamically update the maintained classification information (e.g., within the flow table) as, for example, end-user devices 18 access private network 6, IDP module 4 may automatically provision policies without user input to adapt to changing security capabilities in private network 6.

Consequently, IDP module 4 may reduce network inefficiencies by applying different sets of attack patterns to network traffic received from or destined to (or generally, associated with) each of VLANs 20, for example, instead of applying the same set of attack patterns for each of VLANs 20 to address the lowest common denominator network (e.g., the most vulnerable one of VLANs 20). IDP module 4 may therefore improve network connectivity by reducing resource consumption within IDP module 4, resulting in more packets processed for a given unit of time compared to conventional IDP devices, which may reduce the delay or, possibly the number of packets dropped, during times of high network congestion.

While described in this disclosure with respect to an IDP module 4 integrated within distribution router 10, IDP module 4 may be implemented as separate network security device. That is, distribution router 10 may comprise a router without any security capabilities that routes traffic to a stand-alone network security device that implements the techniques described with respect to IDP module 4. The techniques therefore should not be strictly limited to the exemplary embodiment described herein, but may be implemented by any network device that applies security services to detect attacks within a network, including a router that incorporates the functionality of an IDP device as well as a stand-alone network security device.

Figure 2A:
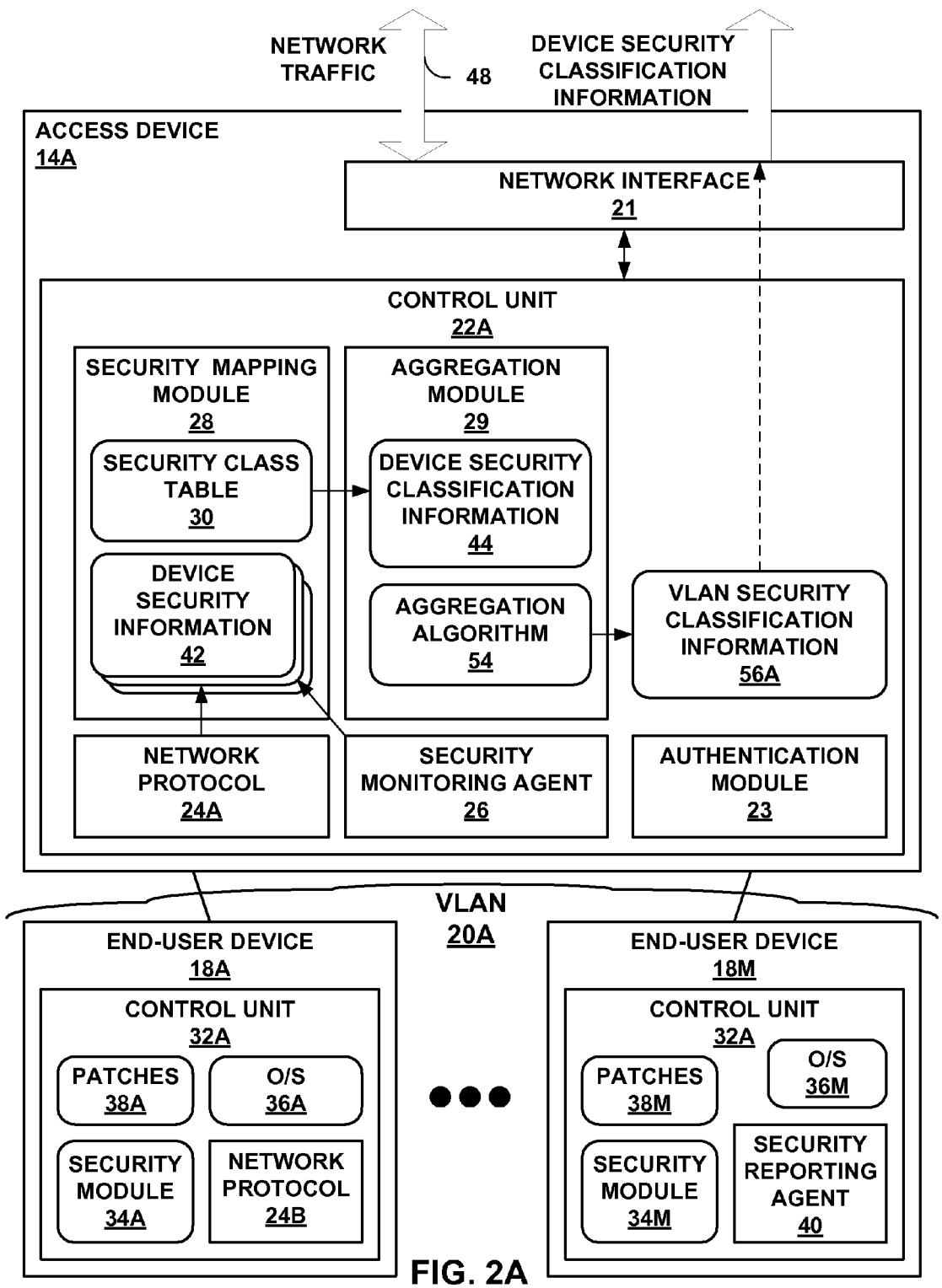
FIGS. 2A, 2B are block diagrams illustrating certain components of the network system of FIG. 1 in more detail.
Figure 2B:
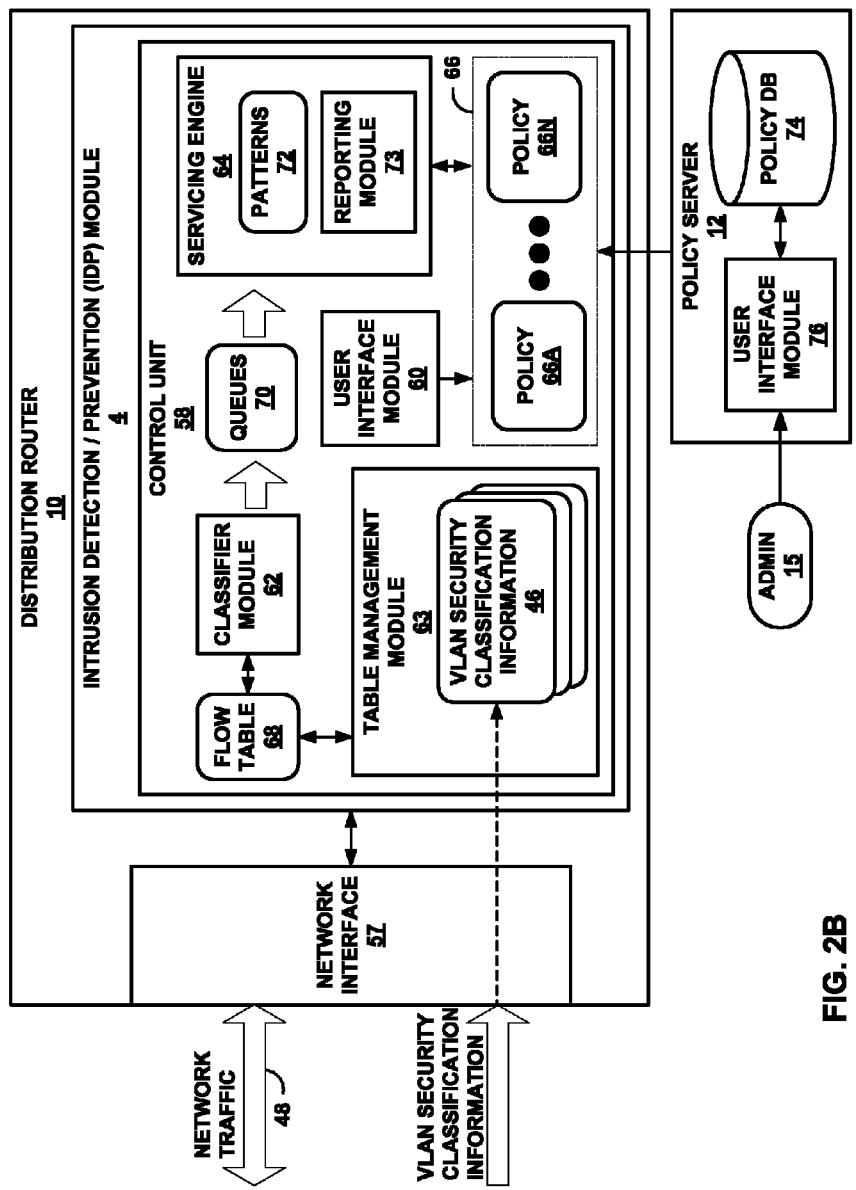

FIGS. 2A, 2B are block diagrams illustrating private network 6 in performing the principles of the invention in more detail. FIG. 2A is a block diagram illustrating access device 14A of private network 6 in collecting and aggregating device security information from end-user devices 18A-18M in accordance with the hierarchical security techniques described herein. While various modules, elements, agents, units and other components are described below relative to access device 14A and end-user devices 18A-18M, each of access devices 14 and end-user devices 18 may comprise similar components to that described with respect to access device 14A and end-user devices 18A-18M.

Access device 14A includes at least one network interface 21 and a control unit 22A, where control unit 22A couples to network interface 21. Network interface 21 represents any interface by which access device 14A may send and receive network traffic 48 and other information. Network interface 21 may, in some instances, comprise an interface card or any other removable card for sending and receiving network traffic 48. In other instances, network interface 21 may comprise one or more of an Ethernet port, a serial port, a Universal System Bus (USB) port, a Firewire port, or any other port by which data may be sent and received.

Control unit 22A may comprise hardware, e.g., one or more of a programmable processor, a Field Programmable Gate Array (FPGA), an Application Specific Special Product (ASSP), an Application Specific Integrated Circuit (ASIC), an integrated circuit, etc., and a computer-readable storage medium or memory, e.g., static mediums (a hard drive, an optical drive, a disk drive, FLASH memory, etc.) and/or dynamic mediums (a Random Access Memory or RAM, dynamic RAM or DRAM, etc.). In some instances, the computer-readable storage medium may comprise instructions, such as those used to define a software or computer program, that cause the above listed programmable processor to perform the hierarchical security techniques described herein.

Control unit 22A may include a plurality of modules, including an authentication module 23, a network protocol module 24 ("network protocol 24A"), a security monitoring agent 26, a security mapping module 28 and an aggregation module 29. Each of these modules 23-29 may comprise hardware and/or software modules. Authorization module 23 may represent a module that communicates with authentication server 16 in order to authenticate end-user devices 18A-18M in the manner described above. Network protocol 24A may represent a module that implement a protocol for collecting the above described security information from end-user devices 18A-18M. Network protocol 24A may comprise an extension to an 802.1x authentication protocol or any other similar authentication protocol.

Security monitoring agent 26 may represent a module for communicating with end-user devices 18A-18M to collect security information. Security monitoring agent 26 may comprise the server-side to the above describe UAC, which communicates with client-side UACs, such as security reporting agent 40, included within one or more of end-user devices 18A-18M. Security mapping module 28 may represent a module that maps the collected security information from each of end-user devices 18 to a respective security class. Security mapping module 28 may include and maintain a security class table 30 that defines a plurality of mappings between various aspects of security information and security classes. In effect, security class table 30 may represent a module that receives security information and outputs a security class. Aggregation module 29 may represent a module for aggregating device security classification information 44 on a per network, sub-network or VLAN basis in accordance with an aggregation algorithm 31. For example, aggregation module 29 may inspect device security classification information 44 and determine a range of IP addresses that represent a VLAN, such as VLAN 20A.

Each of end-user devices 18A-18M include a control unit 32A-32M ("control units 32"), which may, similar to control unit 22A, comprise hardware, e.g., one or more of a programmable processor, a Field Programmable Gate Array (FPGA), an Application Specific Special Product (ASSP), an Application Specific Integrated Circuit (ASIC), an integrated circuit, etc., and a computer-readable storage medium or memory, e.g., static memory (a hard drive, an optical drive, a disk drive, FLASH memory, etc.) and/or dynamic memory (a Random Access Memory or RAM, dynamic RAM or DRAM, etc.). In some instances, the computer-readable storage medium may comprise instructions, such as those used to define a software or computer program, that cause the above listed programmable processor to perform the hierarchical security techniques described herein.

Each of control units 32 may also include security modules 34A-34M ("security modules 34"), operating system modules 36A-36M ("O/S 36"), and patches 38A-38M ("patches 38"), respectively. Security modules 34 may each represent a module that performs anti-virus security services, firewall security services and any other security service to inspect incoming and outgoing network traffic for respective ones of end-user devices 18. These security services may comprise services similar to those performed by IDP module 4 in that each of security modules 34 may apply patterns or signatures to detect network attacks within incoming and outgoing (from the perspective of end-user devices 18) network traffic. However, security modules 34 may not be able to detect attacks that target multiple network devices or that target network-wide vulnerabilities.

O/S modules 36 represent modules that provide a basic interface to respective ones of end-user devices 18 and may include a Windows operating system, a MacOS, a Linux operating system, as well as any other operating system that provides a platform on which software may execute. Each of patches 38 typically represents small software or firmware upgrades that address or "patch" security or other concerns with hardware and/or software. Often, end-user devices 18A-18M install respective patches 38 to address problems not noticed prior to a manufacturer deploying the software and/or hardware for which patches 38 are intended to patch. Usually, the manufacturer of the software and/or hardware releases the patches, which end-user devices 18 may download and install free-of-charge to patch the troublesome software and/or hardware. For example, Microsoft Corporation releases patches the second Tuesday of each month for free download and installation to address security concerns with Microsoft software, including Microsoft Office and the Windows operating system.

One or more of control units 32 of end-user devices 18A-18M, e.g., control unit 32A, may also include a network protocol module 24B similar, if not substantially the same, as network protocol 24A described above with respect to control unit 22A. Each of network protocol modules 24A, 24B ("network protocols 24" or "network protocol modules 24") may be the same in that these network protocol modules 24 may implement the same network protocol to communicate (security information) with one another. One of more control units 32 of end-user devices 18A-18M, e.g., end-user device 18M, may further include a security reporting agent 40 that represents a module for communicating security information to security monitoring agent 26. Security reporting agent 40 may comprise the above described client-side UAC. While end-user devices 18A-18M are shown in FIG. 2A to include either of network protocol 24 or security reporting agent 40 for ease of illustration, end-user devices 18 may each include one or both of network protocol 24B and security reporting agent 40, as well as, any other module for communicating security information to access devices 14.

Initially, a user (not shown in FIG. 2A) may interact with one of end-user devices 18A-18M via a user interface presented by a user-interface module (also not shown in FIG. 2A) to connect to private network 6. To access private network 6, the user may, for example, interact with a web browser, a file management system, an email application, a database application, or any other user interface capable of accessing private network 6. For purposes of illustration, it is assumed that end-user device 18A attempts to access private network 6. Access device 14A generally and authentication module 23 may redirect the access attempt to authentication server 16, which may request via authentication module 23 authentication information from end-user device 18A. End-user device 18A may prompt the user via the user interface for the authenticating information, e.g., username and password combination, and upon receiving this information, forward the information to authentication module 23, which proceeds to forward the information to authentication server 16. Authentication server 16 then authenticates the end-user-provided authenticating information in the manner described above.

Assuming successful authentication, network protocol modules 24 may communicate with each other, whereby network protocol module 24A requests the above described security information from network protocol module 24B. Network protocol module 24B may determine the security information by analyzing, for example, a current state of each of security module 34A, O/S 36A and patches 38A. Network protocol module 24B may determine a name, type, version and other pertinent information for each of security module 34A, O/S 36A and patches 38A and forward this information in accordance with the protocol to network protocol module 24A. Network protocol module 24A may store this security information for end-user device 18A as device security information 42. Device security information 42 may represent device-specific security information for one or more of end-user devices 18A-18M that are currently accessing and/or have accessed private network 6.

Alternatively, but again assuming successful authentication, security monitoring agent 26 may request security information for end-user device 18M from security reporting agent 40. Security reporting agent 40 may maintain a current state of each of security module 34M, O/S 36M and patches 38M, as well as, any other pertinent security information. Security reporting agent 40 may, in response to the request from security monitoring agent 26, forward the security information to security monitoring agent 26, which stores the received security information as device security information 42 similar to network protocol 24A. In some instances, security reporting agent 40 may forward or report the security information for end-user device 18M not in response to a request but according to a defined schedule, such as once every week, day, hour, or other interval of time. In other instances, security reporting agent 40 may forward or report the security information for end-user device 18M, again not in response to a request from security monitoring agent 26, but in response to changes to one of security module 34M, O/S 36M, patches 38M or any other security capability. This form of reporting may ensure that access device 14A and, consequently, IDP module 4 are kept up-to-date with the current security capabilities of each of end-user devices 18.

Upon receiving a change or otherwise adding to a record to device security information 42, security mapping module 28 may map device security information 42 to device classification information 44 based on security class table 30. Device classification information 44 may be referred to as "44" in that each of access devices 14A-14N may maintain device classification information 44-44N. Device classification information 44 may comprise a classification mapping between each of end-user devices 18A-18M and a respective one of a plurality of security classes defined by security class table 30. For example, the following Table 1 provides one exemplary classification mapping defined by device security classification information 44:

TABLE 1

| End-User Device IP Address | Security Class |
|---|---|
| 192.94.47.1 (end-user device 18A) | Medium (2) |
| 192.94.47.15 (end-user device 18M) | High (3) |

As shown in Table 1, end-user device 18A identified by IP address 192.94.47.1 is mapped to a classification of "Medium," which may be represented by a security class value of two (2). End-user device 18M identified by IP address 192.94.47.15 is mapped to a classification of "High", which may be represented by a security class value of three (3).

After determining device security classification information 44, aggregation module 29 operates in accordance with an aggregation algorithm 31 to aggregate device security classification information 44. Aggregation module 29 may represent a module for aggregating device security classification information 44 on a per network, sub-network or VLAN basis in accordance with aggregation algorithm 31. For example, aggregation module 29 may inspect device security classification information 44 and determine a range of IP addresses that represent a VLAN, such as one of VLANs 20. Aggregation module 29 may then apply aggregation algorithm 31 to aggregate the security classes associated with one or more of, for example, end-user devices 18A-18M of VLAN 20A. That is, aggregation algorithm 31 may determine an aggregate security class for VLAN 20A based on the security classes associated with the one or more of end-user devices 18A-18M currently accessing or that previously accessed private network 6. Aggregation module 29 may store the aggregate security class as VLAN security classification information 46.

The following Table 2 presents an example mapping of VLAN security classification information 46 may store:

TABLE 2

| VLAN IP Subnet Address | Aggregate Security Class |
|---|---|
| 192.94.47.X (VLAN 20A) | Medium (2) |

As shown in the above Table 3, VLAN 20A identified by VLAN IP subnet address 192.94.47.X is mapped to an aggregate security class of medium, which may be identified by a security class value of two (2).

Aggregation algorithm 31 may determine these aggregate security classes in any number of ways. In one instance, aggregation algorithm 31 may determine the aggregate security class for VLAN 20A by setting the aggregate security class to the lowest device-specific aggregate security class stored to device security classification information 44. In other instances, aggregation algorithm 31 may determine the aggregate security class for VLAN 20A by performing a weighted average of the device-specific security classes. Aggregation algorithm 31 may therefore determine the aggregate security classes via any of a variety of mathematical computations, adaptive learning algorithms, artificial intelligence algorithms, etc.

After determining VLAN security classification information 46, control unit 22A may transmit VLAN security classification information 46 to IDP module 4, as shown by the corresponding arrow in FIG. 2A. Access device 14A may also forward to and receive from distribution router 10 network traffic 48, as well as, forward to and receive from end-user devices 18A-18M network traffic 48.

FIG. 2B is a block diagram illustrating distribution router 10 of FIG. 1 in more detail. Distribution router 10 receives VLAN security classification information 46 from each of access devices 14. Distribution router 10 may also receive network traffic 48 from core network 9 and access devices 14. Distribution router 10 may, as described above, include IDP module 4. IDP module 4 includes a network interface 57 and a control unit 58, where control unit 58 couples to network interface 57. Network interface 57 may be substantially similar to network interface 21 of access device 14A, in that network interface 57 represents an interface that sends and receives network traffic, such as network traffic 48. Likewise, control unit 58 may be similar to control unit 22A of access devices 14A, in that control unit 58 may also comprise hardware and a computer-readable storage medium or memory. In some instances, the computer-readable storage medium may comprise instructions, such as those used to define a software or computer program, that cause the hardware, e.g., the above listed programmable processor, to perform the hierarchical security techniques described herein.

Control unit 58 may include a user interface module 60, a classifier module 62, a table management module 63 and a servicing engine module 64 ("servicing engine 64"). Each of these modules 60-64 may comprise hardware, software or any combination thereof to perform the below described functions attributed to each.

User interface module 60 represents a module for interfacing with a user, such as an admin 15, or another computing device. User interface module 60 may present one or more graphical user and/or text-based user interfaces by which admin 15 or another computing device may configure IDP module 4. As described above, admin 15 (although not shown in FIG. 2C) may interact with a user interface presented by user interface module 60 to specify, edit, alter, delete, modify, or otherwise define one or more of a plurality of policies 66A-66N ("policies 66"). As described above, control unit 58 may comprise a storage medium and may store policies 66 to this storage medium. User interface module 60 may, in some embodiments, enable script-based configuration by way of the text-based user interface, such as a command line interface (CLI).

Classifier module 62 represents a module that may classify each of the packets based on information extracted from each packet. One way in which classifier module 62 may classify a packet is to classify each packet as belonging to a particular flow. That is, classifier module 62 may determine to which flow a particular one of the packets of incoming network traffic 48 corresponds by extracting information referred to as a "five-tuple" from each of the packets. As described above, each flow represents a flow of packets in one direction within the network traffic. A five-tuple comprises a source Internet Protocol (IP) address, a destination IP address, a source port, a destination port, and a protocol. Typically, the five-tuple is found within the header of each of the packets and classifier module 62 may parse or otherwise extract the five-tuple from the header of each of the packets to identify to which flow each of the packets corresponds. Classifier module 62 may also extract and utilize additional information to identify a flow, such as source media access control ("MAC") address and destination MAC address.

Based on this five-tuple, classifier module 62 may access flow table 68 to determine which of policies 66 apply to each of the packets of incoming traffic 48. Flow table 68 may therefore maintain flows as entries, or flow entries. Each flow entry may store the identifying five-tuple and a reference to one of policies 66. Classifier module 62 may access this table 68 to determine a flow to which each packet corresponds as well as an associated one of policies 66. Classifier module 62 may then tag or otherwise mark each packet to indicate an associated one of policies 66 to apply to each tagged packet. Classifier module 62 may tag each packet by storing metadata or other information with each packet in a queue, such as one of queues 70. Queues 70 may comprise pre-processing queues that store packets in a first-in, first-out (FIFO) manner prior to processing or application of an associated one of policies 66.

Classifier module 62 may also, as another way of classifying incoming packets, extract application layer information, such as Session Initiation Protocol (SIP) headers and payload data and Real-time Transportation Protocol (RTP) headers and payload data. Classifier module 62 may further include the above described protocol decoders (not shown in FIG. 2C) to extract this application layer information or data to classify each packet. Classifier module 62 may associate each application with different ones of policies 66. That is, classifier module 62 may, based on information extracted by one or more of the above described decoders, determine that a first packet, for example, belongs to an HTTP application, while another packet belongs to an FTP application. Based on these respective classifications, classifier module 62 may associate a first one of policies 66 with the first packet classified as belonging to the HTTP application and associate a second one of policies 32 with the second packet classified as belonging to the FTP application in flow table 68. In this manner, IDP module 4 may adapt the application of policies 66, and thus patterns 72, to different applications, which may enable IDP module 4 to more accurately apply patterns 72 to detect only those network attacks that target a particular protocol, while not detecting those that are harmless to each of the respectively identified protocols to limit the consumption of system resources.

Table management module 63 represents a module that may periodically update a flow table, such as a flow table 68, to reflect changes in the application of policies 66, associate one or more of flows stored to flow table 68 together as a session and otherwise maintain or manage the flow stored to flow table 68. Table management module 63 may receive, via network interface 57, VLAN security classification information 46, which may comprise one or more VLAN-to-security-class mappings, as described above. Control unit 58A may as described above comprise a storage medium (not shown in FIG. 2B), and table management module 63 of control unit 58 may store these mappings or VLAN security classification information 46 to this storage medium.

Table management module 63 may next process VLAN security classification information 46 by updating flow table 68 in accordance with these mappings. In this alternative, table management module 63 may update the flows identified by VLAN security classification information 46, e.g., those flows originating from or destined to end-user devices 18 of each of respective VLANs 20, for which an aggregate security class is associated. Table management module 63 may therefore manage an association between security classes and policies 66 and update flow table 68 with the one of policies 66 identified for the corresponding flow entry to flow table 68. In this respect, classifier module 62, by accessing flow table 68, may classify or otherwise determine one of policies 66 associated with an aggregate security class defined by VLAN security classification information 46.

Servicing engine 64 represents a module that services or otherwise processes the packets of incoming traffic 48. Servicing engine 64 may service or process each packet by applying one of policies 66 to each packet. Each of policies 66 may identify a different set of patterns 72 to apply, where each of policies 66 identifies at least one pattern different from every other one of policies 66. Servicing engine 64 may maintain a full set of patterns 72 that identify a full set of network attacks. Each of policies 66 may identify a set of patterns by indicating whether to apply the full set of patterns 72 or a subset of the full set of patterns 72. After processing each of the packets of incoming traffic 48, servicing engine 64 may, based the application of the corresponding policies 66, forward those packets as outgoing traffic 48.

Policy server 12 includes a policy database 74 ("policy DB 74") and a user interface module 76. Policy database 74 may represent a repository or storage medium for storing policies, such as policies 66. User interface module 76 may represent a module that presents user interface by which admin 15 may interact to define, edit, alter, delete, or otherwise specify those policies stored to policy database 74. User interface module 76 may also present the same or a different user interface with which admin 15 interacts to access, view, sort or otherwise manage those policies stored to policy database 74. After specifying the policies stored to policy database 74, admin 15 may cause policy server 12 to upload one or more of the policies stored to policy database 74 to IDP module 4, which is represented by policies 66.

One or more of policies 66 may be associated with a particular application, while others may be associated with flows. Additionally, one or more other ones of policies 66 may be associated with a particular security class or aggregate security class. In this respect, policies 66 may represent typical policies and policies defined in accordance with the hierarchical security techniques described herein. As a result, IDP module 4 may not only implement the hierarchical security techniques described herein but also those techniques associated with more conventional security devices.

After configuring IDP module 4 in this manner, table management module 63 may receive VLAN security classification information 46 or at least updates, additions, deletions or other information pertinent to maintaining VLAN security classification information 46 in a reasonably current state. That is, table management module 63 may receive, for example, time-based updates, such as hourly, daily, weekly, or monthly, in order to maintain VLAN security classification information 46 in a reasonably current state. In response to these updates, table management module 63 may update VLAN security classification information 46 in accordance with the received updates. Based on VLAN security classification information 46, table management module 63 may periodically update flow entries of flow table 68 to reflect the current state of VLAN security classification information 46.

Meanwhile or in conjunction with table management module 63 receiving VLAN security classification information 46 and updating flow table 68, classifier module 46 may receive incoming traffic 48 and classify each packet of traffic 48 by extracting the above described five-tuple from each packet and performing the above described lookup in flow table 68 based on the extracted five-tuple. If the flow corresponding to the extracted five-tuple is not stored to flow table 68, classifier module 62 may add a flow corresponding to that five-tuple to the table and associate a policy with that new flow in flow table 68. Alternatively, classifier module 62 may instruct table management module 63 to create a new flow entry in flow table 68 and associate one of policies 66 with the new entry. Classifier module 62 may, after classifying each of the packets of incoming traffic 48, then store the packet with a corresponding tag that identifies the associated one of policies 66 in one of queues 70.

Servicing engine 64 may retrieve these packets stored to queues 70 and apply the associated set of patterns defined by one of policies 66 identified by the corresponding tag. Servicing engine 64 may, for example, apply a first set of patterns 72 defined by a first policy 66A, for example, to a packet or first portion of network traffic retrieved from queues 70. Policy 66A may indicate or identify that a full set of known patterns 72, or simply patterns 72, be applied to the associated packet to identify a corresponding full set of known network attacks. Policy 66A may therefore be associated with a low aggregate security class, as applying a full set of network attacks may identify and prevent a comprehensive set of network attacks. Servicing engine 64, in according with policy 66A, may apply each of patterns 72 to the associated packet. Based on the application of patterns 72, e.g., whether any network attacks are identified by patterns 72, servicing engine 64 may forward the associated packet as outgoing traffic 48.

As another example, servicing engine 64 may apply a second set of patterns 72 defined by a second policy 66N to another packet or second portion of traffic 48 retrieved from queues 70. Second policy 66N may identify a subset of patterns 72 different form the full set of policies 72 defined by first policy 66A that servicing engine 64 applies to this second portion of network traffic 48. Second policy 66N may therefore be associated with a higher security class than that of first policy 66A. Again, based on the application of the subset of patterns 72 defined by second policy 66N, servicing engine 64 may forward the associated packet back to distribution router 10 as outgoing traffic 48.

In this manner, servicing engine 64 may apply a first policy 66A and a second policy 66N to different portions of network traffic 48 to compensate for the security capabilities of VLANs 20, resulting in possibly improved network connectivity, especially during times of high network congestion where efficient utilization of system resources is critical. The different ones of policies 66 are applied to varying portions of traffic 48 by way of table management module 63 periodically updating flow table 68 to reflect changes to the security capabilities as defined by VLAN security classification information 46. Classifier module 62 may then correctly classify each of the various portions of traffic 48 such that servicing engine 64 may identify which of policies 66 and therefore patterns 72 to apply to those corresponding portions of network traffic 48.

As a result, IDP module 4 as a whole is more "aware" of the network and servicing engine 64 may apply, based on this "awareness," only those patterns 72 necessary to compensate for particular vulnerabilities of a given network, sub-network, VLAN, device or any other classification. Thus, for secure networks, servicing engine 64 may scale back the number of patterns 72 applied to network traffic 48 associated with secure networks over conventional security devices, thereby reducing system resource utilization and improving network connectivity, especially during times of high network congestion, as discussed above.

Servicing engine 64 may utilize this security classification information not only to improve the efficiency with which to apply patterns 72 to network traffic 48 but also as a basis upon which to forward traffic during times of high network congestion. As described above, during times of high network congestion, servicing engine 64 may receive more network traffic 48 than it can process, thereby delaying or possibly dropping one or more packets of network traffic 48. In some instances, classifier module 62 may determine which portions or packets of network traffic 48 to delay or drop based on the security class to which each of the packets is classified as belonging.

For example, classifier module 62 may receive, during a time of high network congestion, a first packet of network traffic 48 and determine one of policies 66 associated with this packet via flow table 68, as described above. The first policy may be associated with a high security class and may, as a result, indicate that during times of high network congestion classifier module 62 should forward the packet without applying those patterns 72 identified by this first one of polices 66. Classifier module 62 may retrieve this first one of policies 66 and first determine a level of congestion by computing, for example, a remaining capacity of queues 70, a current bandwidth consumption, a system resource utilization, or any other metric indicative of congestion. This first policy may include a threshold or metric by which to compare the computed congestion metric, and servicing engine 64 may compare the congestion metric to the threshold. If the computed congestion metric exceeds the threshold, classifier module 62 may forward the first packet such that servicing engine 64 does not apply the set of patterns 72 defined by the first one of policies 66. Otherwise, classifier module 62 may store the packet to queues 70, whereupon servicing engine 64 may retrieve the packet and apply those of patterns 72 identified by the first one of policies 66.

Typically, the threshold defined by the first one of policies 66 may be lower for those policies 66 associated with a lower security class than that associated with the first one of polices 66, thereby effectively establishing a forwarding gradient by which more secure traffic is forwarded without applying any of patterns 72 during relatively lighter congestion levels while less secure traffic is forwarded without applying any of patterns 72 during relatively heavier congestion levels. That is, a second packet may be associated with a second policy corresponding to a lower security class than that of the first one of policies 66. The second one of polices 66 may therefore define a higher threshold than that defined by the first one of policies 66.

As a result, classifier module 62 typically does not forward the second packet until the computed congestion metric exceeds the second higher threshold, which may generally occur later than that when the computed congestion metric exceeds the first lower threshold. Consequently, classifier module 62 may preferentially forward those packets associated with the more secure network, e.g., the network having the higher security class, over those associated with less security networks, e.g., networks associated with a lower security class, because these less secure networks pose more of a security risk. In this manner, servicing engine 64 may apply the set of patterns defined by each of the first and second policies by applying the set of patterns defined by each of the first and second policy during the times of high network congestion when the security class value indicates a low value but not when the security class value indicates a high value so as to reduce consumption of resources within the network device.

In addition, IDP module 4 may further utilize these security classifications as a basis upon which to route or forward network traffic 48. For example, classifier module 62 may utilize the security classifications to identify security threats that IDP module 4 cannot handle, but that some other (typically, higher-end) IDP module/device can handle. Classifier module 62 may again receive a packet of traffic 48 and determine the one of policies 66 associated with this packet. If the packet is associated with a policy IDP module 4 cannot handle (e.g., a policy that defines patterns 72 not installed within servicing engine 64), classifier module 62 may forward this packet to another IDP device that can handle the security class. Classifier module 62 may therefore maintain a table or other data structure identifying other IDP devices and their associated security capabilities (e.g., as a mapping between IDP devices and security classes). Classifier module 62 may access this table and identify an IDP device that provides the security services (e.g., patterns) defined by the policy associated with this packet. Classifier module 62 may then forward the packet to this identified IDP device, which may apply the appropriate patterns, similar to patterns 72, to protect against threats identified by the security class with which the policy is associated.

As further shown in FIG. 2B, servicing engine 64 may include a reporting module 73. Reporting module 73 may report VLAN security classification information 46 and attack statistics to other specialized security devices, e.g., other devices similar to IDP module 4 but that may feature a higher level of security capabilities. The attack statistics may comprise a log identifying a time of, a type of, a signature or pattern of patterns 72 used to detect and other information for each attack detected by one of patterns 72. The attack statistics may also indicate an amount of traffic processed given an amount of time and other performance statistics. These specialized security devices may receive VLAN security classification information 46 and attack statistics and further aggregate VLAN security classification information 46 and the attack statistics across, for example, a whole network or, in this example, private network 6, in accordance with an aggregation algorithm, such as aggregation algorithm 31. In this respect, aggregation algorithm 31 may be recursive in that algorithm 31 may process an output of algorithm 31, e.g., VLAN classification information, to yield another output of a higher level of abstraction, e.g., network classification information.

The specialized security devices may analyze this further aggregated information to detect system wide attacks and otherwise balance application of IDP services on a network-wide basis. For example, one specialized security device may inspect the network-wide classification and attack statistics to determine that more than one VLAN, e.g., VLANs 20A, 20N, were attacked using the same attack at approximately the same time. This specialized security device may then issue an alert to an administrator, such as admin 15, to indicate that a system-wide attack is ongoing. The specialized security device may also inspect the attack statistics to balance traffic loads among various, specialized security devices, IDP devices and/or routers featuring IDP capabilities. In this manner, the specialized security device may represent yet another layer in the hierarchy above the distribution tier that receives information from reporting module 73 and analyzes the information to identify and/or prevent not only another level of attacks, but also balance inspection loads across varying devices to reduce the load on any one device. This determination of load splits may occur according to a statically configured load split policy, or based on information dynamically reported by reporting modules similar to reporting modules 74, such as a number of sessions per device.

Figure 3:
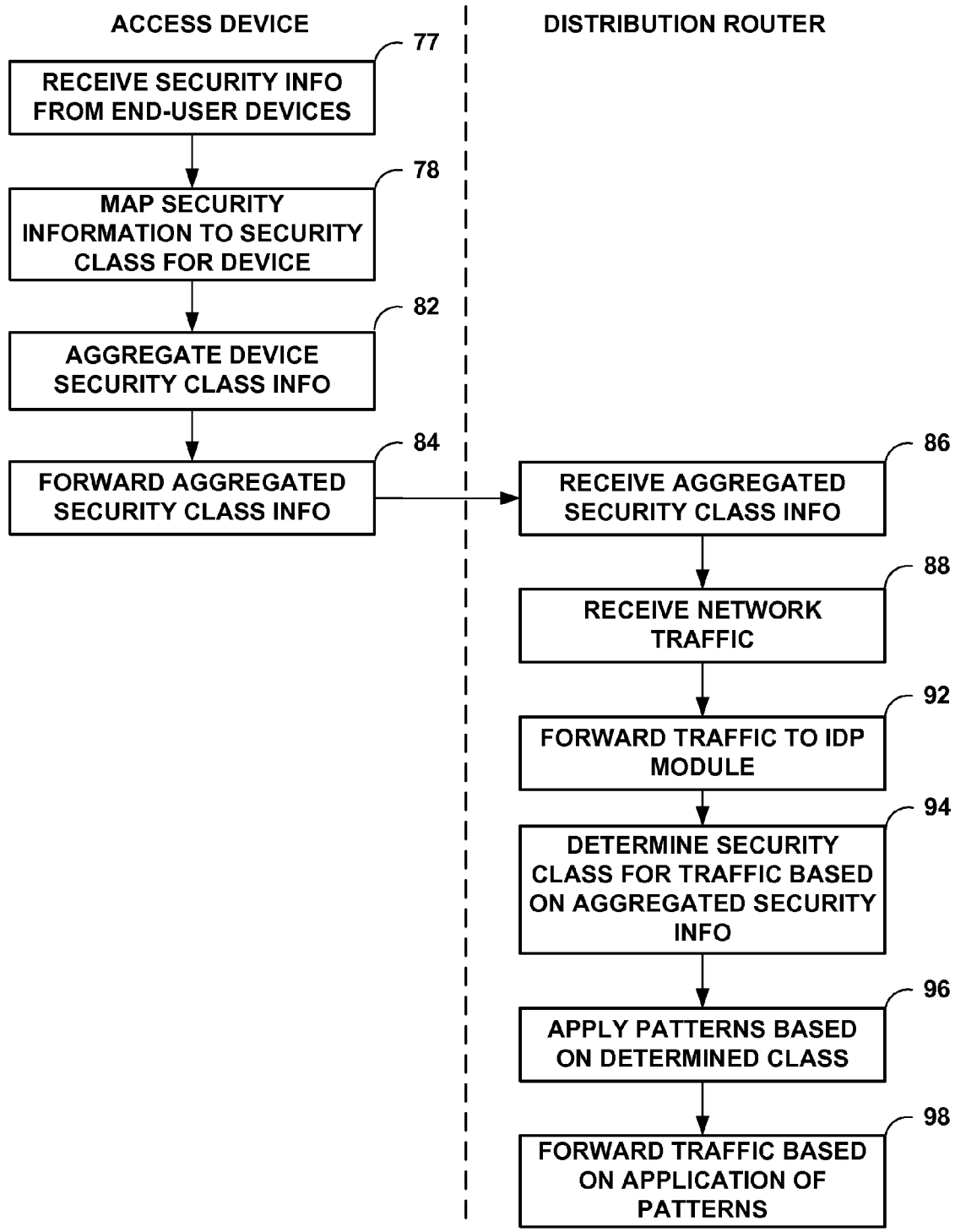
FIG. 3 is a flowchart illustrating an example operation of devices within a network system in performing the hierarchical security techniques described herein.

FIG. 3 is a flow chart illustrating an example operation of network system 2 in performing the hierarchical security techniques described herein. Initially, one or more of access devices 14 receive security information (info) from one or more of end-user devices 18 in the manner described above (77). For example, access device 14A may receive security information or information concerning the security capabilities of end-user device 18A from end-user device 18A during authentication of end-user device 18A.

Alternatively, access device 14A may utilize Application Identification (AI) and Operating System Finger-Printing (OSFP) to retrieve the device-specific security information. That is, access device 14A may utilize a slim-version of this AI to detect a type and version of an anti-virus (AV)/intrusion prevention system (IPS) or firewall application employed by end-user device 18A. AI may comprise a module that identifies an application executing on an end-user device, such as end-user device 18A, usually by applying patterns to detect specific patterns in packets of an active session. AI may also employ mappings of specific IP addresses, or ports, to applications in order to detect a type and/or version of AV/IPS or firewall executing on end-user device 18A. In this instance, access device 14A may collect details about the OS via an OSFP module. The OSFP module may detect the OS executing on end-user device 18A through inspection of IP packets that are received from end-user device 18A. As another alternative, access device 14A may employ a user access client or security monitoring agent, such as security monitoring agent 26 of FIG. 2A, to retrieve the security information from end-user device 18A.

After receiving the security information, a security mapping module 28 executing within a control unit 22A of access device 14A may map the device-specific security information to a security class stored within security class table 30 (78). Security mapping module 28 may execute a lightweight process using security mapping table 30, which may be configured by admin 15 or some other user, such as a member of a security team. This device security classification may be stored as device security classification information 44. Aggregation module 29 of access devices 14A may, as described above, then aggregate device security classification information 44 in accordance with aggregation algorithm 31 to output aggregate security classification information, e.g., VLAN security classification information 46 (82).

Next, control unit 22A may forward aggregate security classification information, e.g., VLAN security classification information 46, to distribution router 10 (84). Distribution router 10, as shown in FIG. 2B, may include IDP module 4, which may, in some instances, represent any combination of firewall, IDP, and anti-virus hardware and/or software modules. IDP module 4 may be configured with policies 66, e.g., via policy server 12, to handle traffic of one or more security classes. IDP module 4 may inspect inter-VLAN/subnet traffic according to the configured policy and aggregated security data or classification information that was received from access devices 14, e.g., VLAN security classification information 46. In general, as mentioned above, the lower the security class, the higher the security inspection that will be required to ensure network security.

For example, IDP module 4 of distribution router 10 may receive aggregate security classification information, e.g., VLAN security classification information similar to VLAN security classification information 46, from each of access devices 14 (86). In some instances, VLAN security classification information 46 may map more than one VLAN to a corresponding one of the plurality of security classes.

As the hierarchical aggregation of security information and classification of network 6 continues, distribution router 10 receives network traffic 48 (88). Distribution router 10 may receive network traffic 48 from core network 9 or from end-user devices 18 by way of respective access devices 14. Distribution router 10 may forward traffic 48 to IDP module 4 (as shown in FIG. 2B), whereupon classifier module 62 of IDP module 4 classifies at least a portion traffic 48 as belonging to a security class (94). Classifier module 62 may determine a security class by accessing flow table 68, which, as described above, table management module 62 may have previously updated to reflect the aggregate security classification information, e.g., VLAN security classification information 46.

In other words, table management module 63 may, for example, add the aggregated security classification information or VLAN security classification information 46 to flow table 68 upon IDP module 4 receiving this aggregate security classification information. As described above, table management module 63 may add VLAN security classification information 46 by updating flow entries in flow table 68 to reflect the one of policies 66 that serving engine 64 is to apply to packets associated with the corresponding flow identified by the flow entry. In this manner, classifier module 62 may access flow table 68 to determine a security class and corresponding one of policies 66 associated with the security class for each flow, and as a result, VLAN 20 of private network 6.

To access flow table 68, classifier module 62 may parse an IP address from a packet of traffic 48 and use that IP address to retrieve a flow entry having that IP address within flow table 68. Upon retrieving the flow entry, classifier module 62 may identify one of policies 66 to apply to that packet, where the policy corresponds to one of the security classes. Thus, classifier module 62 may indirectly classify traffic 48 to one or more security classes or, in other words, determine a security class for at least a portion of traffic 48 by way of flow table 68. Likewise, classifier module 62 may determine the one of policies 66 associated with the security class by accessing flow table 68, as well.

Classifier module 62 may, after classifying each packet of traffic 48, store traffic 48 and tags or other metadata identifying the associated one of policies 66 for each packet of traffic 48 to queues 70 in the manner described above. Servicing engine 64 may retrieve the packets and associated tags from queues 70 and apply the one of policies 66 identified by the tag to the corresponding one of the packets. In applying the one of policies 66, servicing engine 64 applies a set of patterns 72 identified by the one of policies 66. Moreover, because each of policies 66 may be associated with a particular one of the service classes, servicing engine 64 may apply the set of patterns 72 identified by the one of policies 66 based on the determined class (96).

As further described above, IDP module 4 may forward the traffic based on the application of the set of patterns 72 identified by the associated one of policies 66 (98). That is, if any of the set of patterns 72 detect an attack, servicing engine 64 may quarantine, delete, or prevent forwarding of the packet and possibly any other packets of the same flow. However, if not attacks are detected for the packet, servicing engine 64 may forward the packet to a destination identified by the packet under inspection.

Figure 4:
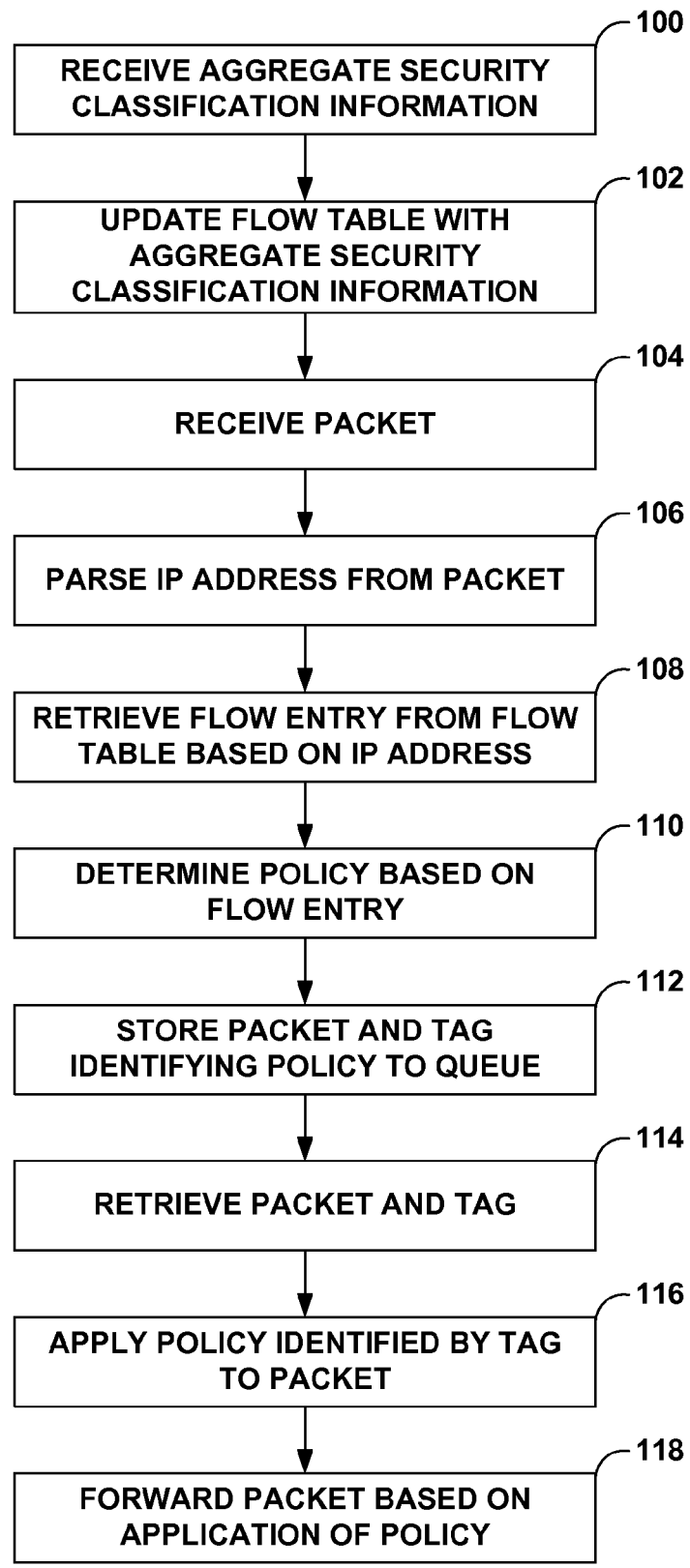
FIG. 4 is a flowchart illustrating operation of network layer IDP devices, such as layer three (L3) routers that incorporate security services, in performing the hierarchical security techniques in more detail.

FIG. 4 is a flowchart illustrating operation of IDP module 4 of FIG. 2B in performing the hierarchical security techniques in more detail. Initially, table management module 63 of IDP module 4 may receive aggregate security classification information (100). Table management module 63 may, as an example, receive VLAN security classification information 46 from each of access devices 14. Table management module 63 may, upon receiving this aggregate security classification information, update flow table 68 with this aggregate security classification information (102).

In some instances, table management module 63 may update flow table 68 with the aggregate security classification information by first determining a policy associated with the identified VLAN or IP subnet prefix. Table management module 63 may maintain a table identifying mappings between a plurality of security classes and corresponding policies. Table management module 63 may, for example, determine that a security value of "high," which may be represented a three (3), corresponds to policy 66A, while a security value of "low," which may be represented as two (2), corresponds to policy 66B. Table management module 63 may next determine which flow entries of flow table 68 correspond to the VLAN IP subnet address. As the VLAN IP subnet address may identify a range of IP addresses, table management module 63 may accesses those flow entries associated with the range of IP addresses and update each of these entries to indicate that the corresponding policy applies to this flow.

For example, if table management module 63 received VLAN security classification information 46 suggesting that VLAN 20A having an IP subnet address of 192.94.47.X has a "medium" security class, table management module 63 may determine that all IP addresses in the inclusive range of 192.94.47.0 through 192.94.47.255 should be associated with policy 66B. Table management module 63 may then access flow table 68 and update all flows entries identifying flows destined for or originating from any IP address in the above range. Table management module 63 may update each of these identified flow entries to indicate that packets associated with these flows are to be inspected in accordance with policy 66B. By so updating flow table 68 in this manner, classifier module 62 may access flow table 68, not only to determine a security class for each received packet, but also which policy to apply to each received packet based on the determined security class.

For example, classifier module 62 may receive a packet, which may represent a portion of network traffic 48 (104). Classifier module 62 may parse an IP address from the packet, or more particularly, a header of the packet (106). Classifier module 62 may use the parsed IP address as a key into flow table 68 to retrieve a flow entry (108). Based on the flow entry, classifier module 62 may determine a security class and corresponding one of policies 66 associated with the security class, as table management module 63 maintains flow table 68 in the above manner to reflect the aggregate security classification information (110). Classifier module 62 may then store the packet and a tag identifying the associated one of policies 66 to one of queues 70 (112).

Servicing engine 64 may retrieve the packet and the tag and apply the associated one of policies 66 identified by the tag (114, 116), as described above. In some instances, servicing engine 64 may, during times of high network congestion, not apply the associated one of policies 66. Servicing engine 64 may determine whether to apply the associated one of policies 66 based on the one of the plurality of services classes to which the one of policies 66 corresponds. That is, servicing engine 64 may determine that those policies 66 associated with a service class value of two or higher are not to be applied, as these service classes assure that downstream devices, e.g., end-user devices 18, are applying sufficient security services to adequately protect against network attacks. However, servicing engine 64 may determine that those policies 66 associated with a service class value of one or lower are to be applied to the corresponding packets, as those policies 66 are required to ensure adequate protection against network attacks for which the downstream devices, e.g., end-user devices 18, cannot protect themselves against.

Figure 5:
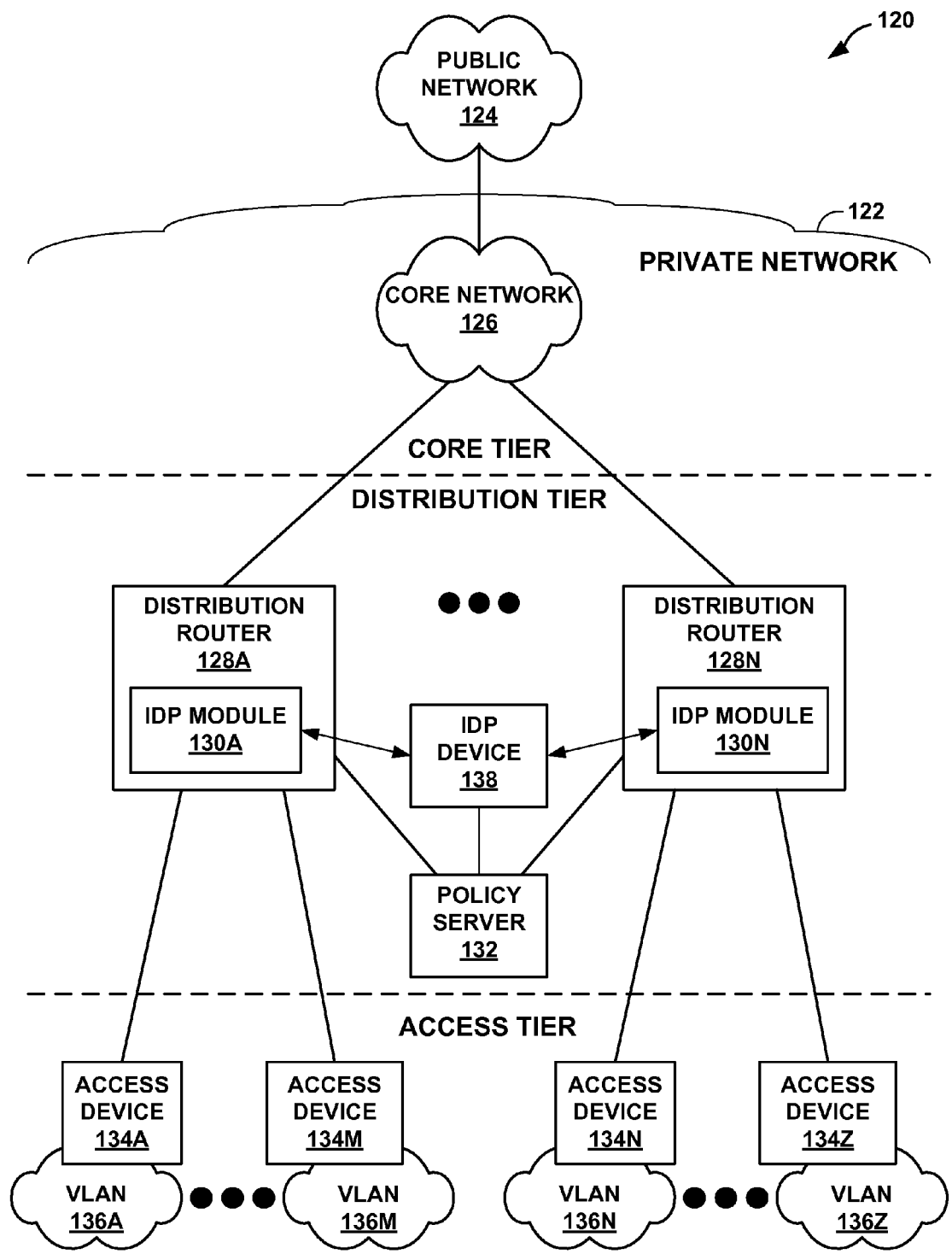
FIG. 5 is a block diagram illustrating another exemplary network system that operates in accordance with the hierarchical security techniques described herein.

FIG. 5 is a block diagram illustrating another exemplary network system 120 that operates in accordance with the hierarchical security techniques described herein. As shown in FIG. 5, network system 120 includes private network 122 coupled to a public network 124. Private network 122 may be similar, if not substantially similar, to private network 6 of FIG. 1. Likewise, public network 124 may be similar, if not substantially similar, to public network 8 of FIG. 1.

Private network 122, much like private network 6, is organized according to the three-tiered hierarchical model. In the core tier, private network 122 includes a core network 126, which may be similar, if not substantially similar, to core network 9. In the distribution tier, private network 122 includes a plurality of distribution routers 128A-128N ("distribution routers 128"), each of which may be similar, if not substantially similar, to distribution router 10. Each of distribution routers 128 may include a respective IDP module 130A-130N, which may be similar, if not substantially similar, to IDP module 4. Private network 122, also in the distribution tier, includes a policy server 132. Policy server 132 may be similar, if not substantially similar, to policy server 12.

Private network 122 also includes, in the access tier, access devices 134A-134Z ("access devices 134"), where a first set of access devices 134A-134M couple to a first distribution router 128A and a second set of access devices 134N-134Z couple to a second distribution router 128N. Each of access devices 134 may couple to end-user devices of respective VLANs 136A-136Z ("VLANs 136"), much like access devices 14. The end-user devices of respective VLANs 136 are not shown in FIG. 5 for ease of illustration purposes, however, end-user devices of VLANs 136 may be similar, if not substantially similar, to end-user devices 18. Likewise, VLANs 136 may be similar, if not substantially, similar to VLANs 20.

Access devices 134 may also be similar, if not substantially, similar to access devices 14, particularly with respect to collecting and aggregating security information in accordance with the hierarchical security techniques described herein. In other words, each of access devices 134 may receive device-specific security information from end-user devices of each of VLANs 136, map this information to device-specific security classification information and aggregate this device-specific security information into aggregate security classification information, e.g., VLAN security classification information 46. Each of access devices 134 may also forward the aggregate security information to respective distribution routers 128, where IDP module 130 processes this information to update respective flow tables maintained by each of IDP modules 130.

Private network 122, in contrast to private network 6, also includes an IDP device 134. IDP device 134 may represent a stand-alone network security device that includes that modules, elements, units, engines, and other components to implement the functionality described above with respect to these same components of IDP module 4. IDP device 134 may also, however, represent a specialized security device in that IDP device 134 may aggregate the aggregated security classification information into information representing yet another level of abstraction. That is, the aggregated security classification information abstracts the device-specific security classification information into subnet or VLAN security classification information, where a VLAN comprises an aggregation of devices. IDP device 138 may then receive this VLAN security classification information and aggregate this VLAN security classification information into network security classification information, where a network comprises an aggregation of VLANs. IDP device 138 may employ an aggregation module similar to that described with respect to IDP modules 4, and in this sense, the aggregation algorithm of both of these aggregation modules may be considered recursive, as described above.

IDP device 138 may receive and aggregate this information in order to detect network-wide attacks or attacks spanning multiple ones of VLANs 136. As one network-wide attack may focus on VLAN 136A services by distribution router 128A and another VLAN 136N serviced by a router 128N different from router 128A, neither of respective IDP modules 130A, 130N may be able to detect the attack, as neither can view the attack as a whole. As a result, IDP modules 130A, 130N, by way of a reporting module similar to reporting module 73 shown in FIG. 2B, may forward VLAN security classification information and attack statistics maintained by the respective reporting modules to IDP device 138. IDP device 138 may aggregate this information and apply patterns, similar to patterns 72, to detect network wide attacks.

In some instances, IDP device 138 may also represent the above described specialized security device that applies a higher level of patterns to detect more severe network attacks. IDP modules 130 may learn of the service capabilities of one another as well as those of IDP device 138. IDP modules 130 may then, as described above, route packets of network traffic classified as belonging to security classes for which the receiving one of IDP modules 130 is unable to handle to IDP device 138. IDP device 138 may then apply the more time-consuming or otherwise higher level of security services to these portions of the network traffic IDP modules 130 are unequipped to handle. IDP device 138, in this instance, may represent a specialized security device that may be described as "higher-end" in that IDP device 138 may cost more money and provide a fuller set of security services.

IDP device 138 may also represent a specialized security device that receives and aggregates the aggregate security classification information and attack statistics from distribution routers 128. Based on this information IDP device 138 may perform some level of load balancing to more efficiently balance traffic loads among the various IDP modules 130 and IDP device 138. IDP device 138 may for example indicate to IDP module 130 that it should forward all low security classified traffic to IDP module 130B, as IDP module 130B may not be fully utilized. IDP device 138 may be statically configured with the set loads each of IDP modules 130 should handle or may dynamically determine the loads based on the attack statistics. IDP device 138 may also inspect each of IDP modules 130 and determine the number of flows each of IDP modules 130 are handling and dynamically balance the loads based on this information as well. Regardless of how loads are balanced, however, IDP device 138 may adjust the balance of loads based on security classification information and the security capabilities of each of IDP modules 130, unlike conventional IDP devices that typically rebalance loads based solely on bandwidth availability.

As a result of this rebalancing, IDP devices 138 and IDP modules 130 may communicate such that loads may be rebalanced. This rebalancing communication may further enable IDP device 138 and IDP module 130 to offload traffic to one another. Offloading of traffic may be particularly useful during times of high network congestion, as IDP module 130A, for example, may offload traffic to IDP module 130B, when IDP module 130A begins to overrun its queues, e.g., queues 70. IDP module 130A may transmit a message requesting that IDP module 130B handle a set of flows, as identified by IP addresses. IDP module 130A may then forward this traffic to IDP module 130B such that IDP module 130B may handle, e.g., detect and/or prevent attacks for, these flows. In some instances, IDP modules 130 and/or IDP device 138 may offload flows based on the security class associated with these flows. In any event, by maintaining security classification information, IDP device 138 and IDP modules 130 may become more aware of network 122 in general and the security capabilities of network 122 in particular. As a result, these devices/modules may more efficiently detect and/or prevent network attacks by eliminating overlapping application of security services and thereby improve network connectivity.

While described above with respect to a single device, e.g., router 10 or routers 128, the techniques may be implemented by any network device capable of applying security services to detect and/or prevent network attacks. That is, access devices 134 may, for example, include respective IDP modules similar that of IDP modules 130 to more efficiently detect and/or prevent network attacks in accordance with the techniques. The techniques therefore should not be limited to a multi-device scenario, where one device, e.g., one of access devices 134 collect and aggregate security information, and another device, e.g., one of distribution routers 128, uses this aggregate security information to classify network traffic and efficiently apply policies to detect network attacks occurring within this network traffic. Instead, the techniques may be implemented by a single device that both collects and aggregates the information and applies one or more polices based on this aggregated security information.

Various embodiments of the invention have been described. These and other embodiments are within the scope of the following claims.

The invention claimed is:

1. A method comprising:
  receiving, with a network device, security classification information sent to the network device from a second network device, wherein the security classification information identifies at least one mapping between a security class and at least one computing device, wherein the security class identifies security capabilities of the at least one computing device;
  after receiving the security classification information from the second network device, receiving, with the network device, network traffic associated with the at least one computing device;
  applying, with the network device, a set of patterns defined by a policy associated with the security class to the network traffic to detect any of a corresponding set of network attacks; and
  forwarding, with the network device, the network traffic based on the application of the set of patterns.

2. The method of claim 1,
  wherein receiving the security classification information comprises receiving first aggregated security classification information that identifies a first mapping between a first security class and a first set of computing devices and receiving second aggregated security classification information that identifies a second mapping between a second security class and a second set of computing devices,
  wherein receiving the network traffic comprises receiving a first portion of the network traffic associated with one or more computing devices of the first set of computing devices and receiving a second portion of the network traffic associated with one or more computing devices of the second set of computing devices,
  wherein applying the set of attack patterns comprises applying a first set of patterns defined by a first policy to the first portion of the network traffic to detect the first set of corresponding network attacks and applying a second set of patterns defined by a second policy to the second portion of the network traffic to detect the second set of corresponding network attacks, the first set of patterns and the second set of patterns differing by at least one pattern, and
  wherein forwarding the network traffic comprises forwarding the first portion and the second portion of the network traffic based on the application of the first and the second sets of patterns, respectively.

3. The method of claim 1, further comprising:
  after receiving the security classification information, determining the policy associated with the security class; and
  updating at least one flow entry of a flow table maintained by the network device to associate the determined policy with a packet flow associated with the at least one computing device,
  wherein applying the set of patterns comprises:
    parsing the network traffic to determine at least one network address associated with the at least one computing device;
    accessing the flow table using the at least one address to retrieve the flow entry; and
    applying the set of patterns defined by the policy identified by the retrieved flow entry to the network traffic associated with the at least one computing device to detect the corresponding set of network attacks.

4. The method of claim 1, wherein receiving the security classification information comprises receiving aggregated security classification information that identifies a single aggregate mapping between an aggregated security class and a plurality of computing devices, and wherein the security class comprises one security class of a plurality of security classes, the method further comprising:
  collecting security information from each of the plurality of computing devices, wherein the security information identifies the security capabilities of each computing device of the set, respectively;

mapping the collected security information to a security class to output device-specific security classification information that identifies an association, for each of the set of computing devices, between one of the plurality of security classes and the one of the set of computing devices; and aggregating the device-specific security classification information to output the aggregate security classification information that identifies the single aggregate mapping between the aggregated security class and the set of computing devices.

5. The method of claim 1, wherein receiving the security classification information comprises receiving Virtual Local Area Network (VLAN) security classification information that identifies an aggregate mapping between an aggregate security class and a VLAN representative of a logical grouping of a set of computing devices.

6. The method of claim 1, further comprising:
determining a level of congestion;
comparing the level of congestion to a threshold identified by the policy to determine whether to forward the network traffic without applying the set of patterns defined by the policy associated with the security class;
forwarding the network traffic without applying the set of patterns defined by the policy when the level of congestion exceeds the threshold identified by the policy.

7. The method of claim 1, further comprising:
determining whether the network device includes each of the set of patterns defined by the policy associated with the security class mapped to the at least one network device; and
forwarding the network traffic to a network security device without applying the set of patterns defined by the policy based on the determination that the network device does not include one or more of the set of patterns defined by the policy associated with the security class.

8. The method of claim 1, further comprising:
determining whether to offload the network traffic associated with the at least one computing device to a network security device based on the security class mapped to the at least one computing device; and
offloading the network traffic to the network security device associated with the at least one computing device based on the determination.

9. The method of claim 1, further comprising:
collecting attack statistics that log the application of the set of patterns defined by the policy to the network traffic;
reporting the security classification information and the attack statistics to a specialized network security device; and
identifying network-wide network attacks based on the reported security classification information and attack statistics.

10. The method of claim 1, wherein the security capabilities include security capabilities of one or more of an operating system currently executed by the at least one computing device, security software executing within the at least one computing device, and any patches both to the operating system and to the security software executed by the at least one computing device.

11. The method of claim 1, wherein the set of patterns defined by the policy associated with the security class comprise a set of patterns that are not applied by the at least one computing device.

12. The method of claim 1, wherein the set of patterns defined by the policy associated with the security class comprise a set of patterns that identify those attacks to which the at least one computing device is, based on the security capabilities, susceptible.

13. The method of claim 1,
wherein the at least one computing device comprises a first computing device and a second computing device,
wherein receiving the security classification information comprises:
receiving first security classification information that identifies a first mapping between a first security class and the first computing device, the first security class identifying a first level of the security capabilities of the first computing device; and
receiving second security classification information that identifies a second mapping between a second security class and the second computing device, the second security class identifying a second level of the security capabilities of the second computing device that is lower than the first level of the security capabilities of the first computing device, and
wherein applying the set of patterns comprises applying a first set of patterns defined by a first policy associated with the first security class to network traffic associated with the first network device to detect any of a corresponding set of network attacks to which the first computing device is susceptible based on the first security capabilities, and
wherein the method further comprises applying a second set of patterns defined by a second policy associated with the second security class to network traffic associated with the second computing device to detect any of a corresponding set of network attacks to which the second computing device is susceptible based on the second security capabilities, the second set of patterns including more patterns than the first set of patterns as a result of the second security class being lower than the first security class.

14. The method of claim 1, wherein the second network device comprises an access device and the at least one computing device comprises an end-user computing device coupled to the access device and for which the access device provides network access.

15. A network device comprising:
at least one network interface card to receive security classification information sent to the network device from a second network device, the security classification information mapping a security class to at least one computing device within the network, and the security class identifying security capabilities of the at least one computing device
wherein the at least one network interface card, after receiving the security classification information from the second network device, receives network traffic; and
a control unit comprising a processor coupled to the network interface card;
wherein the control unit further comprises a storage medium that stores the security classification information and a policy associated with the security class, and
wherein the processor applies a set of patterns defined by the policy to the network traffic to detect any of a set of network attacks and forwards the network traffic based on the application of the set of patterns.

16. The network device of claim 15, the control unit further comprising:
a table management module that receives first aggregated security classification information that identifies a first mapping between a first security class and a first set of computing devices and a second aggregated security classification information that identifies a second mapping between a second security class different from the first security class and a second set of computing devices;

a classifier module that receives a first portion of the network traffic associated with one or more computing devices of the first set of computing devices and receives a second portion of the network traffic associated with one or more computing devices of the second set of computing devices, and a servicing engine that applies a first set of patterns defined by a first policy to the first portion of the network traffic to detect the first set of network attacks and applyies a second set of patterns defined by a second policy to the second portion of the network traffic to detect the second set of network attacks, wherein the servicing engine forwards the first portion and the second portion of the network traffic based on the application of the first and the second set of patterns, respectively.

17. The network device of claim 15, wherein the storage medium further stores a flow table that includes at least one flow entry for the at least one computing device, the control unit further comprising:

a table management module that determines the policy associated with the security class, and updates the at least one flow entry of the flow table to associate the determined policy with the at least one computing device;

a classifier module that parses the network traffic to determine at least one address associated with the at least one computing device accesses the flow table using the at least one address to retrieve the flow entry, and determines the policy indicated by the retrieved flow entry; and a servicing engine that applies, to the network traffic associated with the at least one computing device, the set of patterns defined by the policy identified by the retrieved flow entry.

18. The network device of claim 15, wherein the control unit further comprises a table management module that receives a Virtual Local Area Network (VLAN) security classification information identifying an aggregate mapping between an aggregate security class and a VLAN representative of a logical grouping of a set of computing devices.

19. The network device of claim 15, wherein the control unit further includes a classifier module that determining a level of congestion, and compares the level of congestion to a threshold identified by the policy, determines whether to forward the network traffic without applying the set of patterns defined by the policy associated with the security class based on the comparison, and forwards the network traffic without applying the set of patterns defined by the policy when the level of congestion exceeds the threshold identified by the policy.

20. The network device of claim 15, wherein the control unit includes a classifier module that determines whether the network device includes each of the set of patterns defined by the policy associated with the security class mapped to the at least one network device and forwards the network traffic to a network security device without applying the policy based on the determination that the network device does not include one or more of the patterns defined by the policy associated with the security class.

21. The network device of claim 15, wherein the control unit includes a classifier module that determines whether to offload the network traffic associated with the at least one computing device to a network security device based on the security class mapped to the at least one computing device, and offloads the network traffic to the network security device associated with the at least one computing device based on the determination.

22. The network device of claim 15, wherein the control unit comprises a reporting module that collects attack statistics that log the application of the set of patterns defined by the policy to the network traffic, and reports the security classification information and the attack statistics to a specialized network security device.

23. The network device of claim 15, wherein the security capabilities include security capabilities of one or more of an operating system currently executed by the at least one computing device, security software executing within the at least one computing device, and any patches both to the operating system and to the security software executed by the at least one computing device.

24. The network device of claim 15, wherein the network device comprises one or more of a router, a network security device, a specialized network security device, and an intrusion detection/prevention (IDP) device.

25. A network system comprising:

a set of computing devices;

an access device coupled to the set of computing devices;

a network device coupled to the access device, wherein the network device includes:

at least one network interface card to receive security classification information sent to the network device from a second network device, the security classification information mapping a security class to at least one computing device within the network, and the security class identifying security capabilities of the at least one computing device, wherein the at least one network interface card, after receiving the security classification information from the second network device, receives network traffic; and a control unit coupled to the network interface, wherein the control unit comprises a storage medium storing the security classification information mapping and a policy associated with the security class, and wherein the control unit applies a set of patterns defined by the policy to the network traffic to detect any of a set of network attacks and forwards the network traffic based on the application of the set of patterns.

26. The network system of claim 25, wherein the set of computing devices comprises a first set of computing devices, and wherein the access device comprises a first access device, the network system further comprising:

a second set of computing devices; and a second access device coupled to the second set of computing devices, wherein the network device couples to both the first and second access devices.

27. The network system of claim 26, wherein the control unit includes:

a table management module that receives first aggregated security classification information from the first access device that identifies a first mapping between a first security class and the first set of computing devices and receives second aggregated security classification information that identifies a second mapping between a second security class different from the first security class and the second set of computing devices;

a classifier module that receives a first portion of the network traffic associated with one or more computing devices of the first set of computing devices and receives a second portion of the network traffic associated with one or more computing devices of the second set of computing devices; and a servicing engine that applies a first set of patterns defined by a first policy to the first portion of the network traffic to detect the first set of network attacks, and applies a second set of patterns defined by a second policy to the second portion of the network traffic to detect the second set of network attacks, wherein the servicing engine forwards the first portion and the second portion of the network traffic based on the application of the first and the second set of patterns, respectively.

28. The network system of claim 25,
wherein the network device further comprises a flow table that includes at least one flow entry for the set of computing devices,
wherein the control unit comprises:
a table management module that receives the security classification information, determines the policy associated with the security class after receiving the security classification information, and updates the at least one flow entry of the flow table to associate the determined policy with the set of computing devices,
a classifier module that parses the network traffic to determine an address associated with each of the set of computing devices, accesses the flow table using each of the addresses to retrieve at least one flow entry, and determines the policy indicated by the at least one retrieved flow entry; and
a servicing engine that applies, to the network traffic associated with the at least one computing device, the set of patterns defined by the policy identified by the retrieved flow entry.

29. The network system of claim 25,
wherein the control unit includes a table management module that receives aggregated security classification information that identifies a single aggregate mapping between an aggregated security class and a set of computing devices, wherein the security class comprises one security class of a plurality of security classes,
wherein the access device further (1) collects security information from each of the set of computing devices, wherein the security information identifies the security capabilities of each computing device of the set, respectively, (2) maps the collected security information to a security class to output device-specific security classification information that identifies an association, for each computing device of the set, between one of the plurality of security classes and the one of the set of computing devices, and (3) aggregates the device-specific security classification information to output the aggregate security classification information that identifies the single aggregate mapping between the aggregated security class and the set of computing devices.

30. The network system of claim 29, wherein the access device collects the security information from each of the set of computing devices as each of the set of computing devices attempt to access a private network to which the access devices control access.

31. The network system of claim 25, wherein the control unit comprises a table management module that receives Virtual Local Area Network (VLAN) security classification information that identifies an aggregate mapping between an aggregate security class and a VLAN representative of a logical grouping of the set of computing devices.

32. The network system of claim 25, wherein the control unit includes a classifier module that determines a level of congestion, compares the level of congestion to a threshold identified by the policy, determines whether to forward the network traffic without applying the set of patterns defined by the policy associated with the security class based on the comparison, and forwards the network traffic without applying the set of patterns defined by the policy when the level of congestion exceeds the threshold identified by the policy.

33. The network system of claim 25, wherein the control unit includes a classifier module that determines whether the network device includes each of the set of patterns defined by the policy associated with the security class mapped to the at least one network device and forwards the network traffic to a network security device without applying the patterns defined by the policy based on the determination that the network device does not include one or more of the set of patterns defined by the policy associated with the security class.

34. The network system of claim 25, wherein the control unit includes a classifier module that determines whether to offload the network traffic associated with the at least one computing device to a network security device based on the security class mapped to the set of computing devices and offloads the network traffic to the network security device associated with the at least one computing device based on the determination.

35. The network system of claim 25, further comprising a network security device coupled to the network device,
wherein the control unit comprises a reporting module that collects attack statistics that log the application of the set of patterns defined by the policy to the network traffic, and reports the security classification information and the attack statistics to the network security device, and
wherein the network security device detects a network-wide attack based on the reported security classification information and attack statistics.

36. The network system of claim 25, wherein the security capabilities include security capabilities of one or more of an operating system currently executed by the at least one computing device, security software executing within the at least one computing device, and any patches both to the operating system and to the security software executed by the at least one computing device.

37. The network system of claim 25,
wherein the network device comprises one or more of a router, a network security device, a specialized network security device, and an intrusion detection I prevention (IDP) device,
wherein the computing device comprises an end-user computing device with which a user interacts that are logically organized into a single Virtual Local Area Network (VLAN), and
wherein the access device comprises one of a layer two access switch, a layer three access switch, and a multilayer access switch.

38. The network system of claim 25, further comprising a policy server that installs the policy within the network device.

39. A non-transitory computer-readable storage medium comprising instructions for causing a programmable processor to:
receive, with a network device, security classification information sent to the network device from a second network device, wherein the security classification information t identifies at least one mapping between a security class and at least one computing device, wherein the security class identifies security capabilities of the at least one computing device;

after receiving the security classification information from the second network device, receive, with the network device, network traffic associated with the at least one computing device;

apply, with the network device, a set of patterns defined by a policy associated with the security class to the network traffic to detect a corresponding set of network attacks; and forward, with the network device, the network traffic based on the application of the set of patterns.

40. A method comprising:

receiving, with one or more layer two (L2) network access device, access requests from a plurality of computing devices;

in response to the access requests, collecting security information from each of the plurality of computing devices by way of at least one communication directed to the network security device, wherein the security information identifies security capabilities of each of the plurality of computing devices;

assigning a first set of the plurality of computing devices to a first security class and assigning a second set of the plurality of computing devices to a second security class based on the security capabilities of each of the computing devices;

receiving, with a layer three (L3) network device, network traffic associated with the plurality of computing devices;

applying, with the L3 network device, a first set of attack detection patterns only to a first portion of the network traffic associated with the first set of the computing devices to detect a corresponding first set of network attacks, wherein the first set of patterns is defined by a policy associated with the first security class;

applying, with the L3 network device, a second set of attack detection patterns only to a second portion of the network traffic associated with the second set of the computing devices to detect a second corresponding set of network attacks, wherein the second set of patterns is defined by a policy associated with the second security class and differs from the first set of patterns by at least one pattern; and forwarding, with the L3 network device, the network traffic based on the application of the first set of patterns and the second set of patterns.

41. The method of claim 40, further comprising:

receiving, with the L2 network access devices, network traffic from the plurality of computing devices in the form on network packets;

appending, with the L2 access devices, tags to the network packets to indicate whether each of the packets was received from one of the computing devices assigned to the first security class or the second security class; and communicating the network packets from the L2 network access devices to the L3 network device for application of the attack detection patterns.

* * * * *